US012763441B2

(12) United States Patent
Saito et al.

(10) Patent No.: US 12,763,441 B2
(45) Date of Patent: Oct. 13, 2026

(54) POWER STORAGE DEVICE AND MANUFACTURING METHOD THEREFOR

(71) Applicant: Prime Planet Energy & Solutions, Inc., Tokyo (JP)

(72) Inventors: Yasuyuki Saito, Kakogawa (JP); Yuki Hara, Himeji (JP); Shota Yamamoto, Kobe (JP); Tomoya Okazaki, Nagakute (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 642 days.

(21) Appl. No.: 18/353,886

(22) Filed: Jul. 18, 2023

(65) Prior Publication Data

US 2024/0072395 A1 Feb. 29, 2024

(30) Foreign Application Priority Data

Aug. 29, 2022 (JP) ................................ 2022-136078

(51) Int. Cl.

| | |
|---|---|
| *H01M 50/567* | (2021.01) |
| *H01M 50/169* | (2021.01) |
| *H01M 50/172* | (2021.01) |
| *H01M 50/536* | (2021.01) |
| *H01M 50/566* | (2021.01) |

(52) U.S. Cl.

CPC ....... *H01M 50/567* (2021.01); *H01M 50/169* (2021.01); *H01M 50/172* (2021.01); *H01M 50/536* (2021.01); *H01M 50/566* (2021.01)

(58) Field of Classification Search

CPC .. H01M 50/103; H01M 50/147; H01M 50/15; H01M 50/169; H01M 50/172; H01M 50/176; H01M 50/536; H01M 50/55; H01M 50/553; H01M 50/566; H01M 50/567; Y02E 60/10

See application file for complete search history.

(56) References Cited

U.S. PATENT DOCUMENTS

2016/0372722 A1* 12/2016 Yoshida .............. H01M 50/528
2019/0221791 A1* 7/2019 Wakimoto ............ H01M 50/50
2020/0274189 A1 8/2020 Muroya et al.

FOREIGN PATENT DOCUMENTS

JP 2020-136105 A 8/2020
WO 2010/089852 A1 8/2010

* cited by examiner

*Primary Examiner* — Victoria H Lynch

(74) *Attorney, Agent, or Firm* — HAUPTMAN HAM, LLP

(57) ABSTRACT

A power storage device includes a welded portion in which a hole circumferential portion of a current collecting member and a swaged and deformed portion of a terminal member are welded, and a first space, which is surrounded by the welded portion, a hole circumferential surface of the hole circumferential portion, and the swaged and deformed portion, is placed adjacent to the welded portion to extend in a circumferential direction along the hole circumferential surface.

6 Claims, 16 Drawing Sheets

POWER STORAGE DEVICE AND MANUFACTURING METHOD THEREFOR

CROSS-REFERENCE TO RELATED APPLICATIONS

This application is based upon and claims the benefit of priority from the prior Japanese Patent Application No. 2022-136078 filed on Aug. 29, 2022, the entire contents of which are incorporated herein by reference.

BACKGROUND

Technical Field

The present disclosure relates to a power storage device and a manufacturing method therefor.

Related Art

JP Patent Application Publication No. 2020-136105A has disclosed a power storage device provided with an electrode body and a case for housing the electrode body. The case is provided with a case body member having an opening and encasing the electrode body and a lid for closing the opening of the case body member, which is provided with a first insertion hole penetrating the lid in a thickwise direction. This power storage device is further provided with a current collecting member, which is placed inside the case to be electrically connected with the electrode body and provided with a hole circumferential portion including a hole circumferential surface that constitutes a second insertion hole, a terminal member, which is provided with a terminal inserting portion of a columnar or a cylindrical shape extending from outside to inside of the case and provided with a swaged and deformed portion formed by swaging and deforming a part of the terminal inserting portion that has been inserted in the first insertion hole and the second insertion hole, and a welded portion in which the hole circumferential portion of the current collecting member and the swaged and deformed portion of the terminal member are welded.

SUMMARY

Technical Problems

The above-mentioned power storage device is manufactured as follows. In a state of inserting the terminal inserting portion in the first insertion hole of the lid and the second insertion hole of the current collecting member, a swaging process is firstly performed to swage and deform a to-be-swaged portion of the terminal inserting portion to form the swaged and deformed portion. A lid structure, in which the terminal member, the current collecting member, and the lid are joined, is formed in this manner. Subsequently, a laser welding process is performed for the lid structure to laser-eld a to-be-welded portion of the hole circumferential portion of the current collecting member and a to-be-welded portion of the swaged and deformed portion of the terminal member.

However, there is a case that adhesion of oil occurs on a surface of the hole circumferential portion of the current collecting member and a surface of the swaged and deformed portion of the terminal member. In such a case, laser-welding the hole circumferential portion of the current collecting member and the swaged and deformed portion of the terminal member in the laser welding process causes vaporization of the oil due to a welding heat, which results in generation of gas in a molten portion. The thus generated gas remains inside a welded portion where the hole circumferential portion of the current collecting member and the swaged and deformed portion of the terminal member are welded, and the thus remaining gas could cause generation of voids in the welded portion. This may result in decrease in strength of the welded portion and decrease in conductivity of the welded portion, which means connection resistance between the current collecting member and the terminal member could become large.

The present disclosure has been made in view of the above circumstances and has a purpose of providing a power storage device achieving decrease in generation of voids in a welded portion of a hole circumferential portion of a current collecting member and a swaged and deformed portion of a terminal member and providing a manufacturing method of the power storage device.

Means of Solving the Problems (1) One aspect of the present disclosure is a power storage device comprising an electrode body and a case housing the electrode body, wherein the case is provided with a case body member having an opening to house the electrode body and a lid closing the opening of the case body member, and having a first insertion hole penetrating through the lid in a thickwise direction, the power storage device includes: a current collecting member provided in the case to be electrically connected to the electrode body, the current collecting member including a hole circumferential portion that has a hole circumferential surface forming a second insertion hole; a terminal member including a terminal inserting portion of any one of a columnar shape and a cylindrical shape extending from outside to inside of the case, the terminal member including a swaged and deformed portion formed by swaging and deforming a part of the terminal inserting portion that has been inserted in the first insertion hole and the second insertion hole; a welded portion in which the hole circumferential portion of the current collecting member and the swaged and deformed portion of the terminal member are welded; and a first space which is surrounded by the welded portion, the hole circumferential surface, and the swaged and deformed portion, the first space being adjacent to the welded portion and extending in a circumferential direction along the hole circumferential surface.

This power storage device has the welded portion where the hole circumferential portion of the current collecting member and the swaged and deformed portion of the terminal member are welded. Further, this power storage device has the first space surrounded by the welded portion, the hole circumferential surface of the current collecting member, and the swaged and deformed portion. This first space is adjacent to the welded portion and extends in the circumferential direction along the hole circumferential surface. The power storage device having this configuration achieves decrease in generation of voids in the welded portion.

Specifically, in the power storage device, the hole circumferential portion of the current collecting member and the swaged and deformed portion of the terminal member are welded to form the molten portion where the to-be-welded portion of the hole circumferential portion and the to-be-welded portion of the swaged and deformed portion have been molten, and this molten portion borders with the first space. Accordingly, in welding the hole circumferential portion of the current collecting member and the swaged and deformed portion of the terminal member, even when oil adheres to a surface of the hole circumferential portion of the current collecting member or a surface of the swaged and deformed portion of the terminal member, and this oil is vaporized due to the welding heat to generate gas in the molten portion, at least a part of the thus generated gas can be evacuated to the first space. The voids generated in the welded portion can be thus reduced, so that strength of the welded portion can be enhanced and conductivity of the welded portion can be improved, thereby achieving decrease in the connection resistance of the current collecting member and the terminal member.

The thus manufactured power storage device therefore achieves decrease in the voids in the welded portion of the hole circumferential portion of the current collecting member and the swaged and deformed portion of the terminal member. This power storage device can achieve increase in the strength of the welded portion and increase in the conductivity of the welded portion.

(2) Further, in the power storage device according to the above (1), preferably, the lid, the terminal member, and the current collecting member are integrated to configure a lid structure, the welded portion is formed not over an entire circumference of the hole circumferential portion but on a part of the hole circumferential portion in a circumferential direction, a non-welded portion, in which the hole circumferential portion and the swaged and deformed portion are not welded, forms a second space in which the hole circumferential surface and the swaged and deformed portion are separated in a radial direction to open the second space to outside of the lid structure, and the first space is communicated with the second space.

This power storage device includes the lid structure in which the lid, the terminal member, and the current collecting member are integrated. Further, the welded portion is formed not over the entire circumference of the hole circumferential portion of the current collecting member but on a part in the circumferential direction of the hole circumferential portion. In other words, the hole circumferential portion of the current collecting member and the swaged and deformed portion of the terminal member are not welded over the entire circumference. Furthermore, the non-welded portion where the hole circumferential portion and the swaged and deformed portion are not welded defines the second space in which the hole circumferential portion and the swaged and deformed portion are separated in a radial direction to open the second space to outside of the lid structure. The second space is communicated with the first space. Accordingly, the first space and the second space constitute an annular space portion extending in the circumferential direction along the hole circumferential surface in planar view of the lid structure. The thus configured power storage device achieves further decrease in the voids in the welded portion.

Specifically, as mentioned above, when the gas is generated in the molten portion at the time of welding the hole circumferential portion of the current collecting member and the swaged and deformed portion of the terminal member, at least a part of the gas can be evacuated to the first space and further to the second space communicated with the first space. The gas can be therefore discharged outside the lid structure from the second space. The voids generated in the welded portion can be further reduced. Accordingly, the thus manufactured power storage device can be a power storage device in which the voids in the welded portion are further reduced.

(3) Another aspect of the present disclosure is a manufacturing method for the power storage device according to the above (1) or (2), preferably, the method including: swaging to form the lid structure in which the terminal member, the current collecting member, and the lid are joined by forming the swaged and deformed portion that is formed by swaging and deforming a to-be-swaged portion of the terminal inserting portion in a state of inserting the terminal inserting portion in the first insertion hole of the lid and in the second insertion hole of the current collecting member; and laser-welding a to-be-welded portion of the hole circumferential portion and a to-be-welded portion of the swaged and deformed portion in the lid structure, wherein in the swaging, the swaged and deformed portion is formed and a third space containing the first space as a space surrounded by the swaged and deformed portion and the hole circumferential portion is formed, the third space is a space adjacent to a side opposite to a side where the to-be-welded portion of the hole circumferential portion and the to-be-welded portion of the swaged and deformed portion are irradiated with a laser beam in the laser-welding, and in the laser-welding, the laser-welding is performed such that a part of a molten portion, in which the to-be-welded portion of the hole circumferential portion and the to-be-welded portion of the swaged and deformed portion are molten, reaches the third space to form the welded portion adjacent to the first space.

According to this manufacturing method, in the process of the swaging, the swaged and deformed portion is formed and also the third space surrounded by the swaged and deformed portion and the hole circumferential portion is defined. This third space contains the first space and is adjacent to an opposite side from a side where the to-be-welded portion of the hole circumferential portion and the to-be-welded portion of the swaged and deformed portion are to be irradiated with the laser beam in the later process of the laser welding. Then, the process of the laser welding is performed such that a part of the molten portion, in which the to-be welded portion of the hole circumferential portion and the to-be-welded portion of the swaged and deformed portion have been molten, reaches the third space to form the welded portion adjacent to the first space.

In starting the laser welding, when the hole circumferential portion and the swaged and deformed portion are to be laser-welded in a state of the oil adhering to a surface of the hole circumferential portion of the current collecting member or a surface of the swaged and deformed portion of the terminal member, even if gas is generated by vaporization of the oil due to the welding heat, at least a part of the gas can be evacuated to the first space contained in the third space. The voids generated in the welded portion can be thus reduced, and thus the strength in the welded portion can be enhanced and the conductivity of the welded portion can be improved. Therefore, the connection resistance between the current collecting member and the terminal member can be decreased.

The first space may be the same space with the third space or may be a part of the third space. The first space becomes a part of the third space in the laser welding in a manner that a part of the molten portion enters in a part of the third space, so that the subject part of the third space is filled with a part of the welded portion, thereby the subject part of the third space has disappeared.

(4) Further, in the manufacturing method for the power storage device according to the above (3), preferably, in the swaging, the swaged and deformed portion is formed and the third space extending in a part of a circumferential direction along the hole circumferential surface and the second space communicated with the third space and extending in a part of the circumferential direction along the hole circumferential surface are formed, the second space is a space opening to outside of the lid structure, the space being formed by separation of the hole circumferential surface and the swaged and deformed portion in a radial direction, the third space and the second space define an annular space portion formed along an entire circumference of the hole circumferential surface in planar view of the lid structure, and in the laser-welding, the hole circumferential portion and the swaged and deformed portion that define the second space are free from laser-beam irradiation while the to-be-welded portion of the hole circumferential portion and the to-be-welded portion of the swaged and deformed portion that define the third space are molten to from the welded portion in a part of the circumferential direction of the hole circumferential portion.

According to this manufacturing method, the process of the swaging is performed to form the swaged and deformed portion and form the third space extending in a part in the circumferential direction along the hole circumferential surface and the second space extending in a part in the circumferential direction along the hole circumferential surface as communicating with the third space. The second space as a space opening to outside of the lid structure is formed by separation of the hole circumferential surface and the swaged and deformed portion in the radial direction.

Further, in the laser welding, portions of the hole circumferential portion and the swaged and deformed portion that constitute the second space are not irradiated with the laser beam but the to-be-welded portion constituting the third space is molten to form the welded portion in a part in the circumferential direction of the hole circumferential portion. Further, this laser welding is performed to form the welded portion adjacent to the first space such that a part of the molten portion, in which the to-be-welded portion of the hole circumferential portion and the to-be-welded portion of the swaged and deformed portion are molten, reaches the third space.

Accordingly, when the hole circumferential portion and the swaged and deformed portion are laser-welded in a state of oil adhering to a surface of the hole circumferential portion of the current collecting member or a surface of the swaged and deformed portion, even if the oil is vaporized by the welding heat to generate gas in the molten portion, at least a part of the gas can be evacuated to the first space contained in the third space, and further, the gas can be evacuated to the second space communicated with the first space to be discharged outside the lid structure. This configuration achieves further reduction in the voids generated in the welded portion.

DETAILED DESCRIPTION OF THE EXEMPLARY EMBODIMENTS

Figure 1:
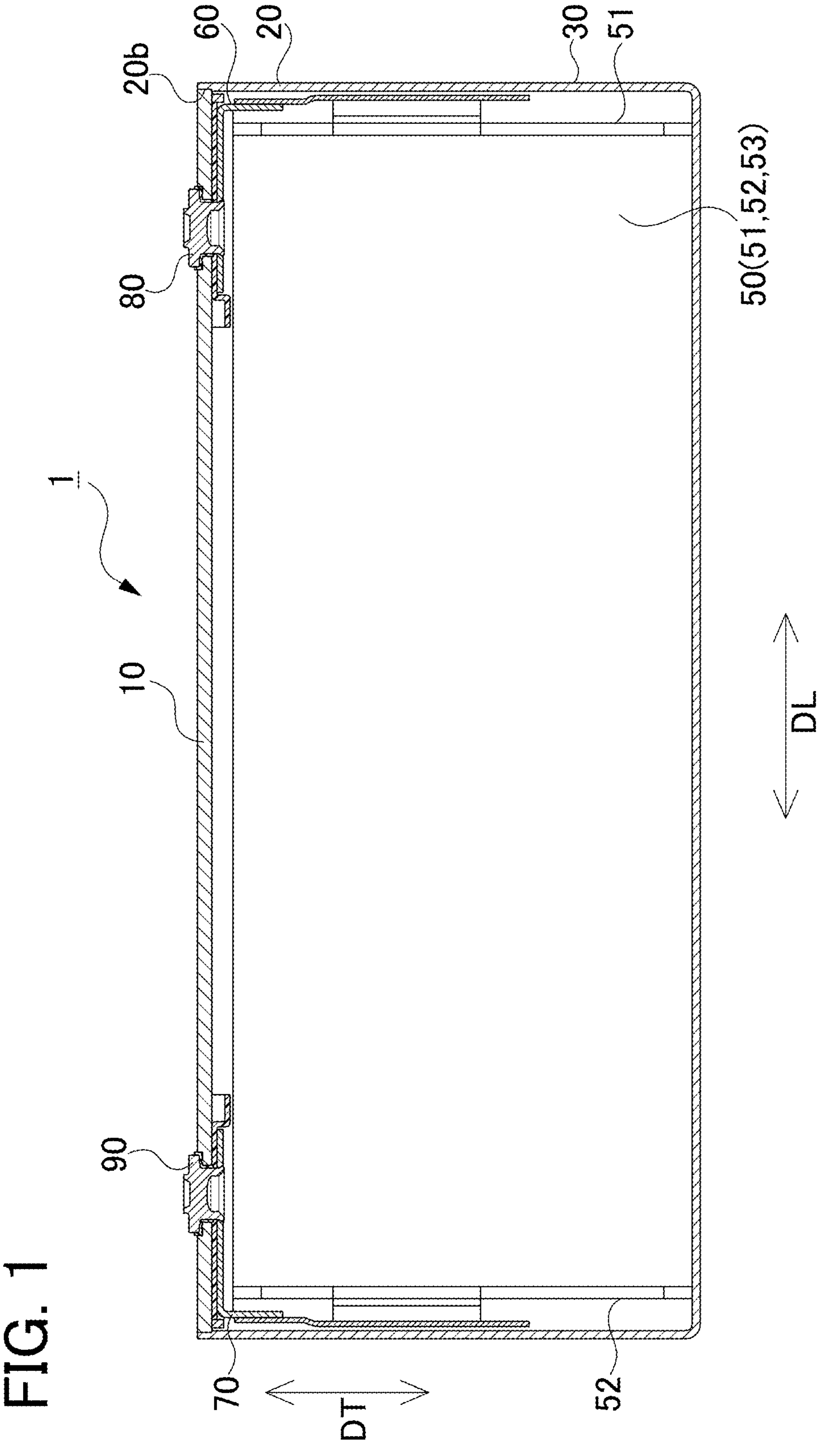
FIG. 1 is a partial sectional view of a power storage device in an embodiment.

An embodiment of the present disclosure is now explained. A power storage device 1 of the present embodiment is a lithium-ion secondary battery. This power storage device 1 is provided with an electrode body 50 and a case 30 for housing the electrode body 50. The case 30 is a metal-made hard case of a rectangular-parallelepiped box-like shape. This case 30 is provided with a metal-made case body 20 of a bottomed rectangular cylindrical shape and a metal-made lid 10 of a rectangular flat plate-like shape (see FIG. 1 and FIG. 2). Among these components, the case body 20 includes an opening 20*b* and encases the electrode body 50. The lid 10 closes the opening 20*b* of the case body 20. This lid 10 includes a positive-electrode first insertion hole 11 and a negative-electrode first insertion hole 12, both of which penetrate through the lid 10 in a thickwise direction DT (see FIG. 1 to FIG. 5).

Figure 2:
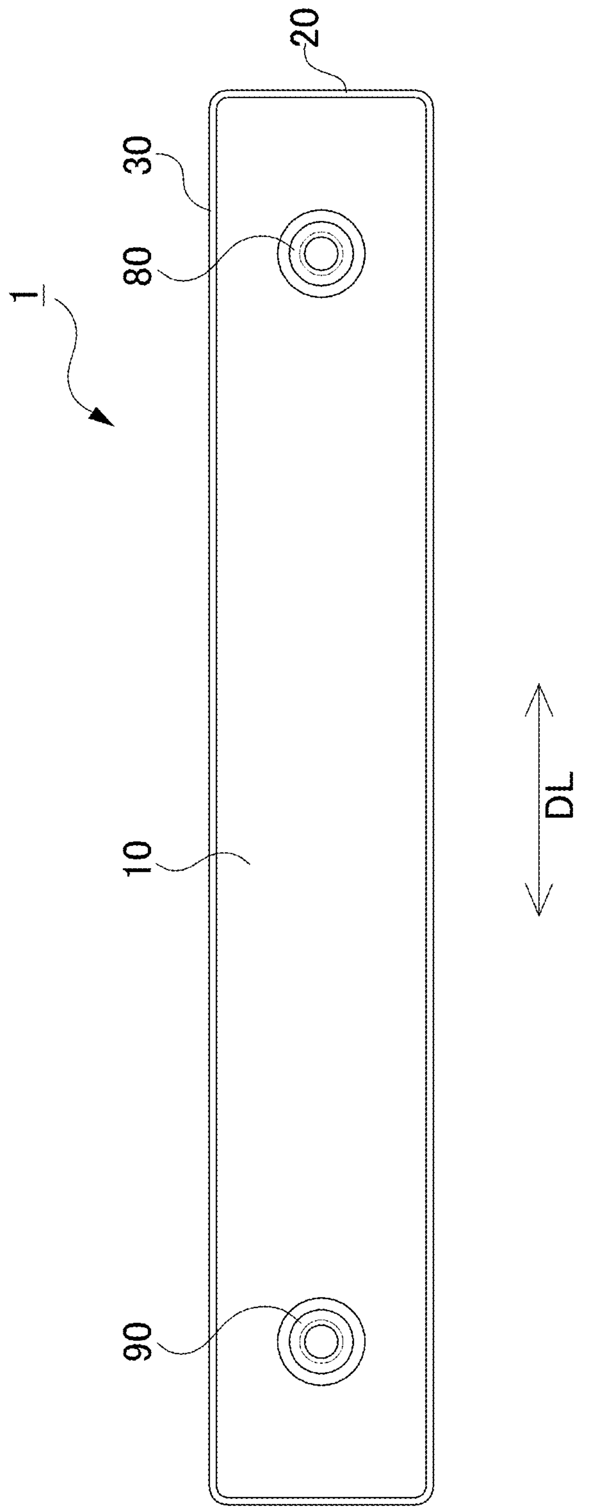
FIG. 2 is a front-surface-side plan view of the power storage device.

The electrode body 50 includes a positive electrode plate 51, a negative electrode plate 52, and a separator 53 interposed between the positive electrode plate 51 and the negative electrode plate 52 (see FIG. 1). Specifically, the electrode body 50 includes the strip-shaped positive electrode plate 51, the strip-shaped negative electrode plate 52, and the strip-shaped separator 53 to configure a flat-wound electrode body in which the positive electrode plate 51 and the negative electrode plate 52 are wound with the separator 53 interposed therebetween. The electrode body 50 contains not-shown electrolytic solution. The not-shown electrolytic solution is also contained inside the case 30 on its bottom surface side.

Figure 3:
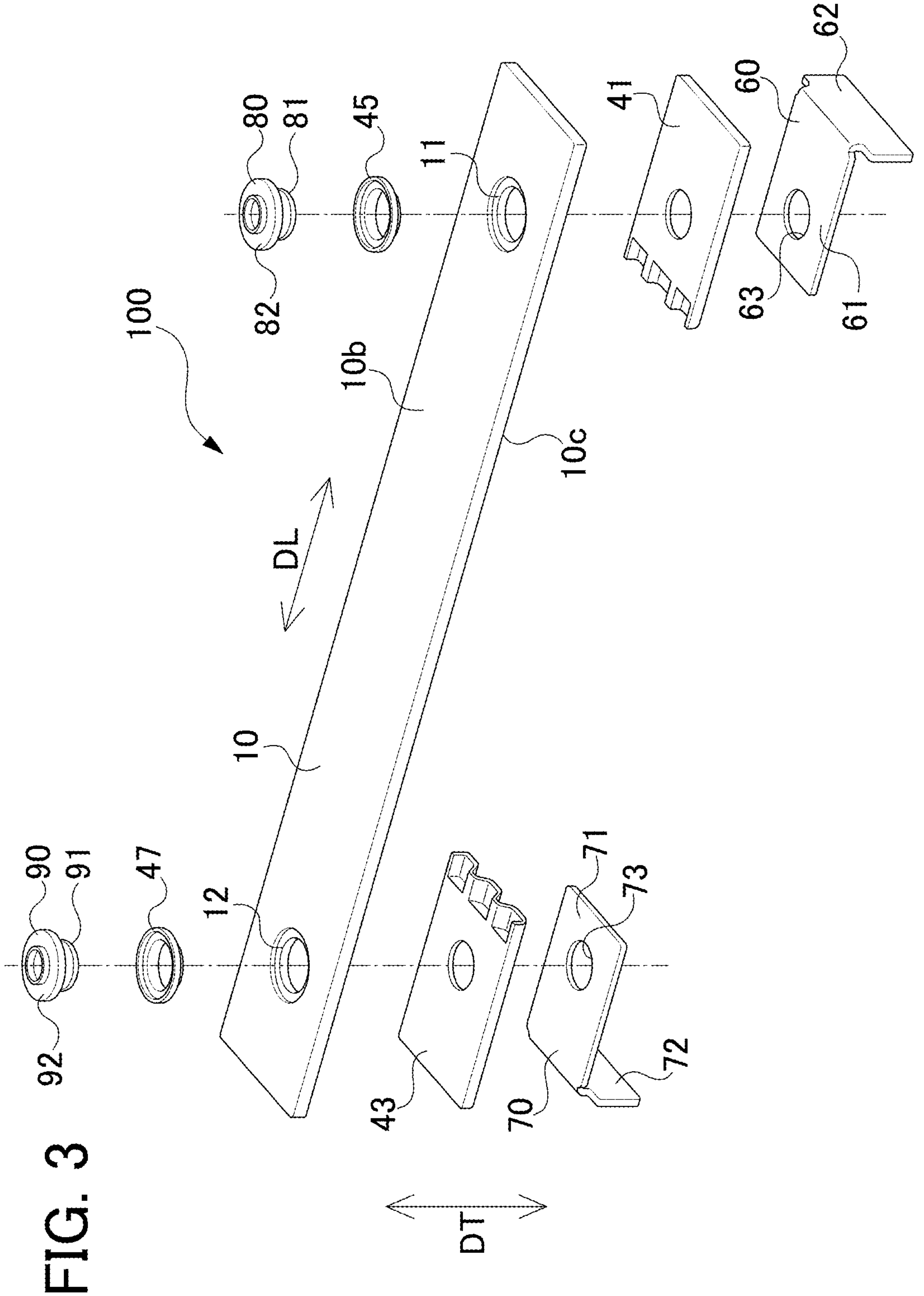
FIG. 3 is an exploded perspective view of a lid structure.
Figure 4:
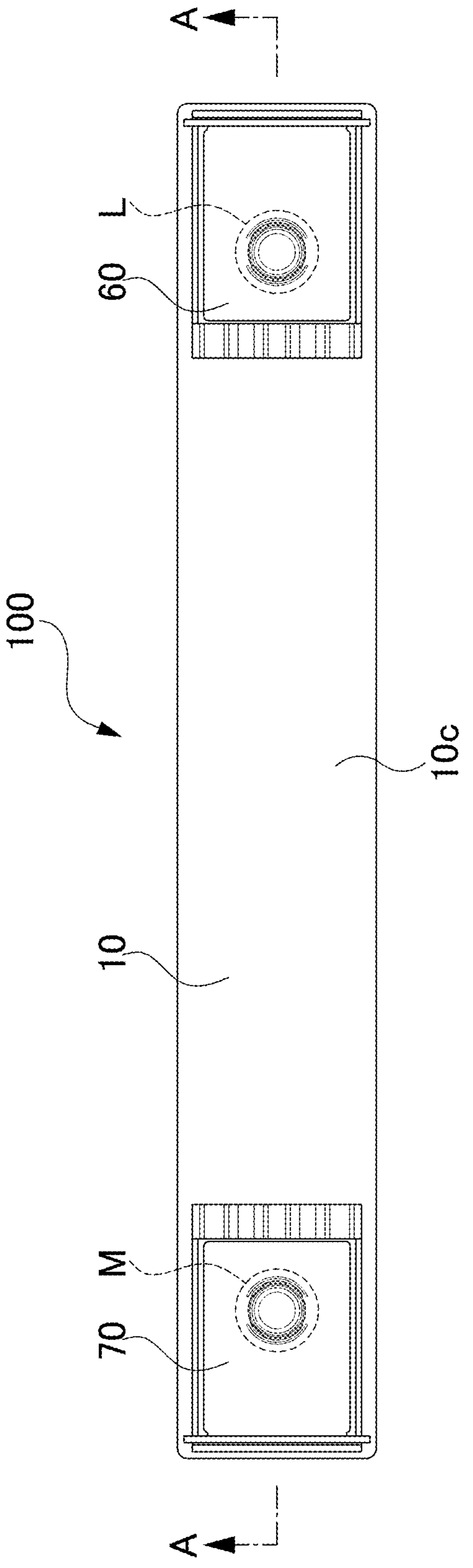
FIG. 4 is a back-surface-side plan view of the lid structure.
Figure 5:
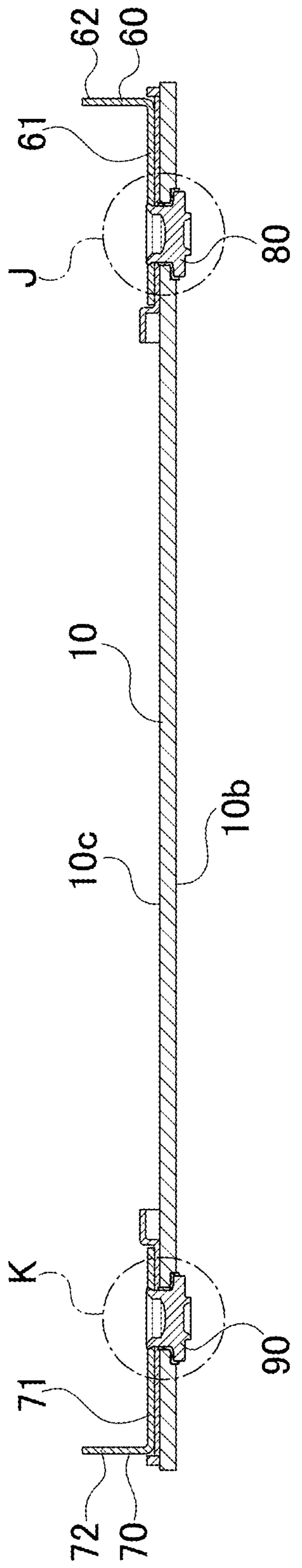
FIG. 5 is a sectional view taken along a line A-A in FIG. 4.
Figure 20:
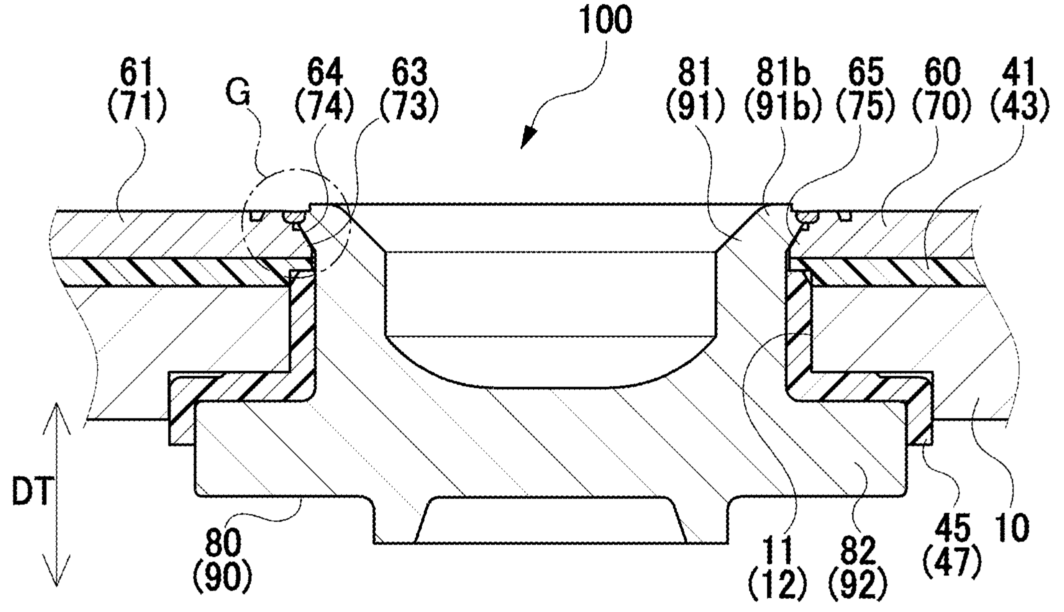
FIG. 20 is an enlarged sectional view at the same position with FIG. 8 after the laser welding process, which corresponds to an enlarged view of a part J and a part K in FIG. 5 and corresponds to a sectional view taken along a line S-S in FIG. 6.

The power storage device 1 further includes a positive current collecting member 60 and a negative current collecting member 70 positioned in the case 30 to be electrically connected to the electrode body 50 (see FIG. 1 to FIG. 5). The positive current collecting member 60 includes a positive-electrode first current collecting portion 61 of a rectangular flat plate-like shape extending in a longitudinal direction DL (a direction orthogonal to the thickwise direction DT) of the lid 10 and a positive-electrode second current collecting portion 62 of a rectangular flat plate-like shape extending in the thickwise direction DT of the lid 10. The positive-electrode first current collecting portion 61 is formed with a positive-electrode second insertion hole 63 penetrating through the positive-electrode first current collecting portion 61 in the thickwise direction (see FIG. 3). The positive-electrode first current collecting portion 61 is formed with a hole circumferential portion 65 having a hole circumferential surface 64 that constitutes the positive-electrode second insertion hole 63 (see FIG. 20). This positive current collecting member 60 is electrically connected to the positive electrode plate 51 of the electrode body 50 through the positive-electrode second current collecting portion 62. Herein, FIG. 20 is an enlarged view of a part J and a part K in FIG. 5. FIG. 3 and FIG. 5 are opposite in their upper and lower positional relation.

The negative current collecting member 70 includes a negative-electrode first current collecting portion 71 of a rectangular flat plate-like shape extending in the longitudinal direction DL of the lid 10 and a negative-electrode second current collecting portion 72 of a rectangular flat plate-like shape extending in the thickwise direction DT of the lid 10 (see FIG. 1 to FIG. 5). The negative-electrode first current collecting portion 71 is formed with a negative-electrode second insertion hole 73 penetrating through the negative-electrode first current collecting portion 71 in the thickwise direction (see FIG. 3). The negative-electrode first current collecting portion 71 includes a hole circumferential portion 75 having a hole circumferential surface 74 that constitutes the negative-electrode second insertion hole 73 (see FIG. 20). This negative current collecting member 70 is electrically connected to the negative electrode plate 52 of the electrode body 50 through the negative-electrode second current collecting portion 72.

Figure 21:
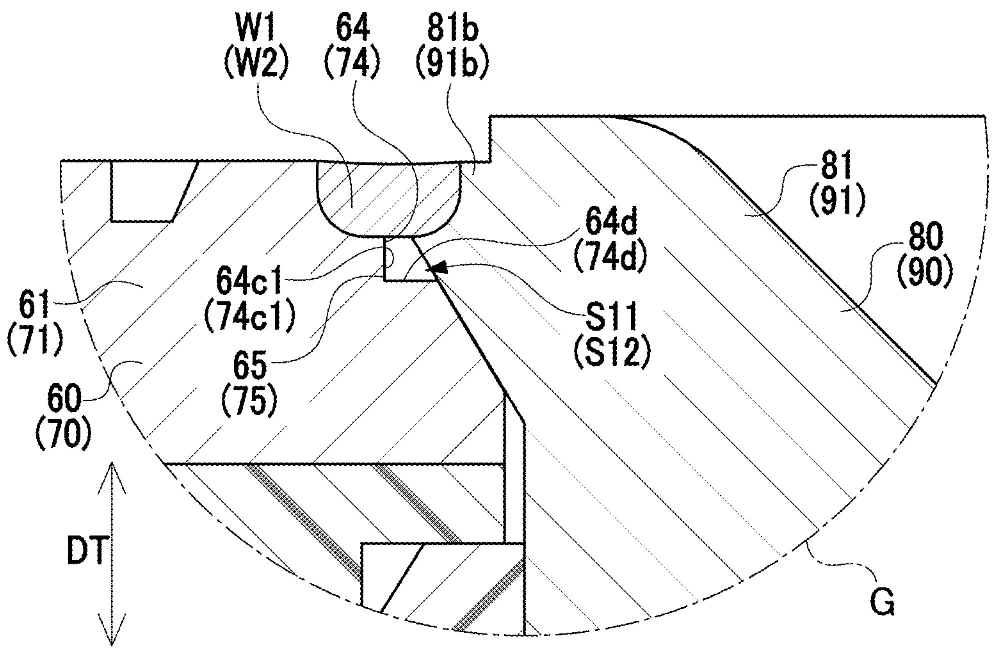
FIG. 21 an enlarged view of a part G in FIG. 20.

Further, the power storage device 1 includes a positive terminal member 80 and a negative terminal member 90 (see FIG. 1 to FIG. 5). The positive terminal member 80 includes a positive terminal inserting portion 81 of a bottomed cylindrical shape extending from outside to inside of the case 30 and a positive annular flange portion 82 positioned radially outside the positive terminal inserting portion 81. The positive terminal inserting portion 81 is inserted in the positive-electrode first insertion hole 11 and the positive-electrode second insertion hole 63. The positive annular flange portion 82 is located outside the case 30. A part of the positive terminal inserting portion 81, specifically, a leading end portion constitutes a swaged and deformed portion 81*b* which has been swaged and deformed (see FIG. 21 and FIG. 23).

The negative terminal member 90 includes a negative terminal inserting portion 91 of a bottomed cylindrical shape extending from outside to inside of the case 30 and a negative annular flange portion 92 positioned radially outside the negative terminal inserting portion 91. The negative terminal inserting portion 91 is inserted in the negative-electrode first insertion hole 12 and the negative-electrode second insertion hole 73. The negative annular flange portion 92 is located outside the case 30. A part of the negative terminal inserting portion 91, specifically, a leading end portion constitutes a swaged and deformed portion 91*b* which has been swaged and deformed (see FIG. 21 and FIG. 23).

Further, the power storage device 1 includes a positive welded portion W1 (see FIG. 6 and FIG. 21) formed by welding the hole circumferential portion 65 of the positive current collecting member 60 and the swaged and deformed portion 81*b* of the positive terminal member 80. The power storage device 1 further includes a negative welded portion W2 formed by welding the hole circumferential portion 75 of the negative current collecting member 70 and the swaged and deformed portion 91*b* of the negative terminal member 90.

Further, the power storage device 1 has a positive-electrode first space S11 (see FIG. 21) surrounded by the positive welded portion W1, the hole circumferential surface 64, and the swaged and deformed portion 81*b*. This positive-electrode first space S11 is adjacent to the positive welded portion W1 and extends in a circumferential direction along the hole circumferential surface 64. Specifically, the positive-electrode first space S11 of a circularly arcuate shape in planar view is positioned below the positive welded portion W1 of a circularly arcuate shape in planar view in FIG. 6. Further, the power storage device 1 has a negative-electrode first space S12 (see FIG. 21) surrounded by the negative welded portion W2, the hole circumferential surface 74, and the swaged and deformed portion 91*b*. This negative-electrode first space S12 is adjacent to the negative welded portion W2 and extends in the circumferential direction along the hole circumferential surface 74. Specifically, the negative-electrode first space S12 of the circularly arcuate shape in planar view is positioned below the negative welded portion W2 of the circularly arcuate shape in planar view in FIG. 6. The thus configured power storage device 1 achieves reduction in voids in the positive welded portion W1 and in the negative welded portion W2.

To be more specific, in welding the hole circumferential portion 65 of the positive current collecting member 60 and the swaged and deformed portion 81*b* of the positive terminal member 80, this power storage device 1 is configured such that a molten portion, in which a to-be-welded portion 65*w* of the hole circumferential portion 65 and a to-be-welded portion 81*w* of the swaged and deformed portion 81*b* are molten, borders with the positive-electrode first space S11. Similarly, in welding the hole circumferential portion 75 of the negative current collecting member 70 and the swaged and deformed portion 91*b* of the negative terminal member 90, a molten portion, in which a to-be-welded portion 75*w* of the hole circumferential portion 75 and a to-be-welded portion 91*w* of the swaged and deformed portion 91*b* are molten, borders with the negative-electrode first space S12.

Accordingly, in welding the hole circumferential portion 65 and the swaged and deformed portion 81*b* in a state of oil adhering to a surface of the hole circumferential portion 65 or a surface of the swaged and deformed portion 81*b*, even if this oil is vaporized by the welding heat to generate gas in the molten portion, at least a part of the gas can be evacuated to the positive-electrode first space S11. Similarly, in welding the hole circumferential portion 75 and the swaged and deformed portion 91*b*, at least a part of the gas generated in the molten portion can be evacuated to the negative-electrode first space S12.

The above configuration can achieve reduction in the voids generated in the positive welded portion W1 and the negative welded portion W2, and thus the strength of the positive welded portion W1 and the negative welded portion W2 can be enhanced and also conductivity of the positive welded portion W1 and the negative welded portion W2 can be improved. Accordingly, the connection resistance of the positive current collecting member 60 and the positive terminal member 80 can be lowered, and the connection resistance of the negative current collecting member 70 and the negative terminal member 90 can be lowered.

Figure 10:
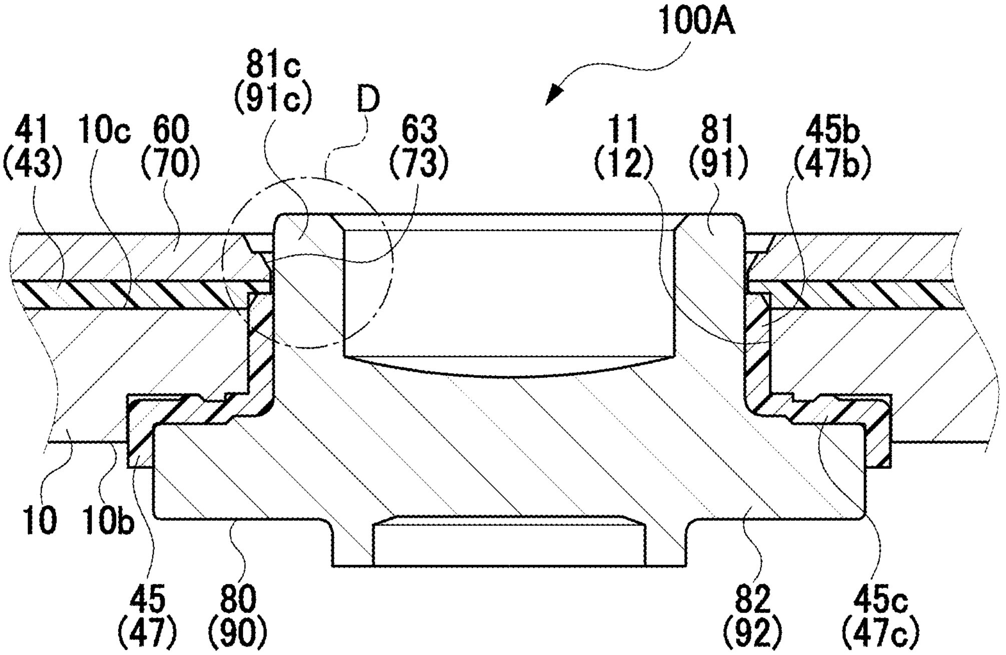
FIG. 10 is an enlarged sectional view taken along a line P-P in FIG. 7 in which the hole circumferential portion that is to become a non-welded portion later is cut in section.

The power storage device 1 includes a lid structure 100 in which the lid 10, the positive current collecting member 60, the positive terminal member 80, a positive insulation plate 41, a gasket 45, the negative current collecting member 70, the negative terminal member 90, a negative insulation plate 43, and a gasket 47 are integrated (see FIG. 3 to FIG. 5). The gasket 45 includes a cylindrical portion 45*b* of a cylindrical shape and an annular flange portion 45*c* positioned radially outside on one end portion of the cylindrical portion 45*b*, and the gasket 47 includes a cylindrical portion 47*b* of a cylindrical shape and an annular flange portion 47*c* positioned radially outside on one end portion of the cylindrical portion 47*b* (see FIG. 10). Further, the positive welded portion W1 is not formed over the entire circumference of the hole circumferential portion 65 of the positive current collecting member 60 but formed partly in the circumferential direction of the hole circumferential portion 65 (see FIG. 6). In other words, the hole circumferential portion 65 of the positive current collecting member 60 and the swaged and deformed portion 81*b* of the positive terminal member 80 are welded not over the entire circumference. Specifically, the positive welded portion W1 is of a circularly arcuate shape in planar view and two positive welded portions W1 are formed via a positive non-welded portion NW1 interposed therebetween in the circumferential direction of the hole circumferential portion 65. The positive non-welded portion NW1 extends in the circumferential direction along the hole circumferential portion 65 (the hole circumferential surface 64) as a portion where the hole circumferential portion 65 and the swaged and deformed portion 81*b* are not welded (see FIG. 6).

Figure 22:
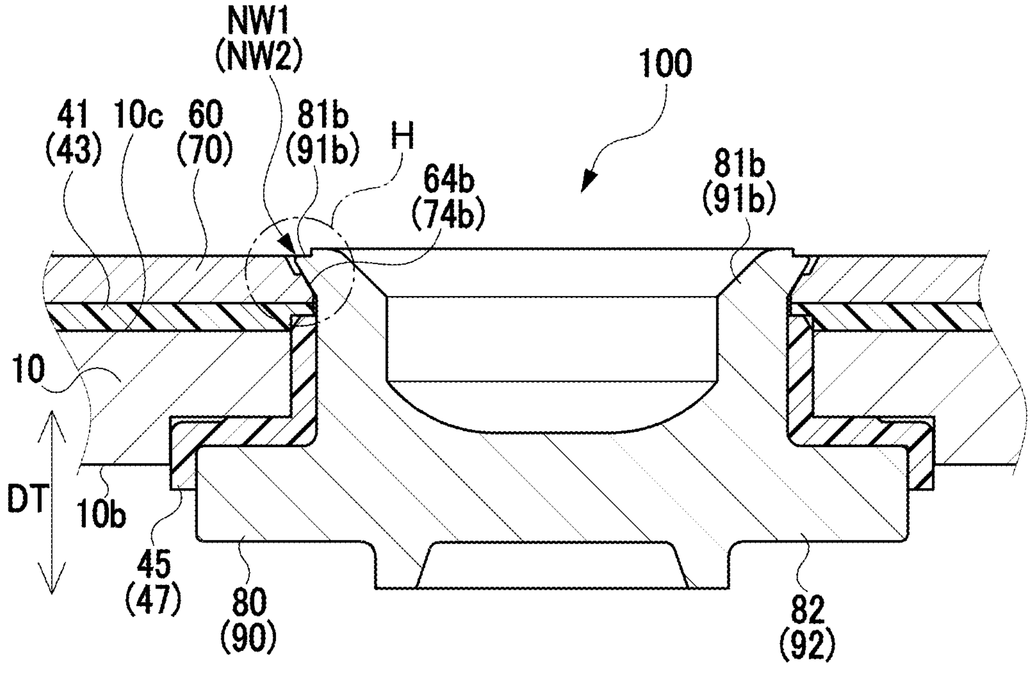
FIG. 22 is an enlarged sectional view at the same position with FIG. 10 after the laser welding process, which corresponds to a sectional view taken along a line T-T in FIG. 6.
Figure 23:
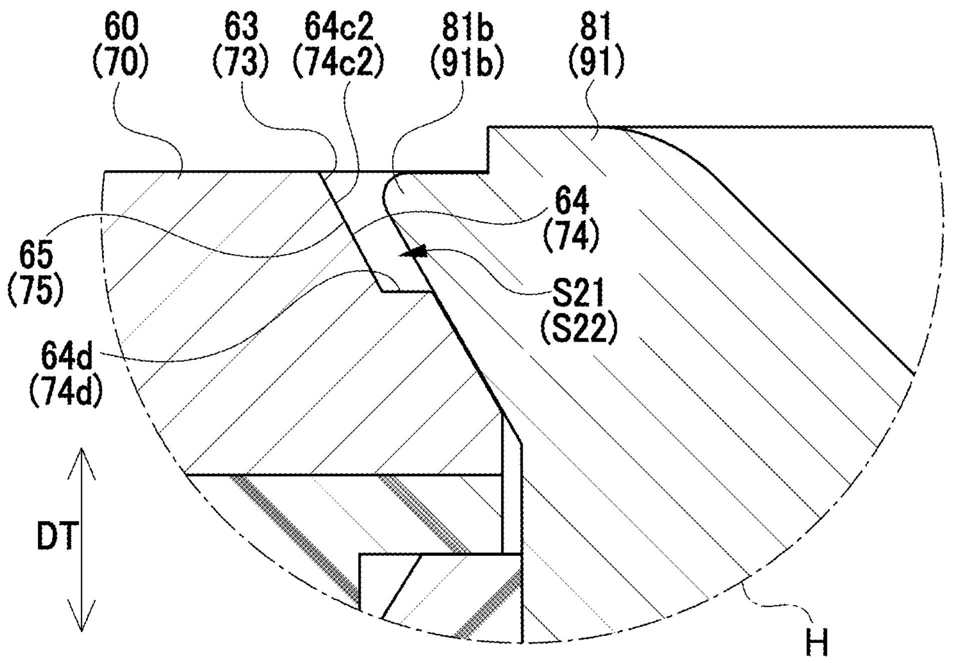
FIG. 23 is an enlarged view of a part H in FIG. 22.

Further, the positive non-welded portion NW1 constitutes a positive-electrode second space S21 defined by the hole circumferential portion 65 and the swaged and deformed portion 81*b* which are separated from each other in the radial direction of the positive-electrode second insertion hole 63 so that the space S21 opens toward outside of the lid structure 100 (see FIG. 22 and FIG. 23). This positive-electrode second space S21 is communicated with the positive-electrode first space S11. Specifically, the positive-electrode second space S21 and the positive-electrode first space S11 are linked to each other in the circumferential direction of the hole circumferential surface 64. Accordingly, in planar view of the lid structure 100, the positive-electrode first space S11 and the positive-electrode second space S21 constitute an annular space portion extending in the circumferential direction along the hole circumferential surface 64. The thus configured power storage device 1 achieves further reduction in the voids generated in the positive welded portion W1.

To be specific, as mentioned above, in welding the hole circumferential portion 65 of the positive current collecting member 60 and the swaged and deformed portion 81*b* of the positive terminal member 80, gas is generated in the molten portion, but at least a part of this gas can be evacuated from the positive-electrode first space S11. Moreover, the gas can be evacuated to the positive-electrode second space S21 that is communicated with the positive-electrode first space S11, thereby discharging the gas outside the lid structure 100 from the positive-electrode second space S21. As a result of this, the voids generated in the positive welded portion W1 can further be reduced.

Figure 6:
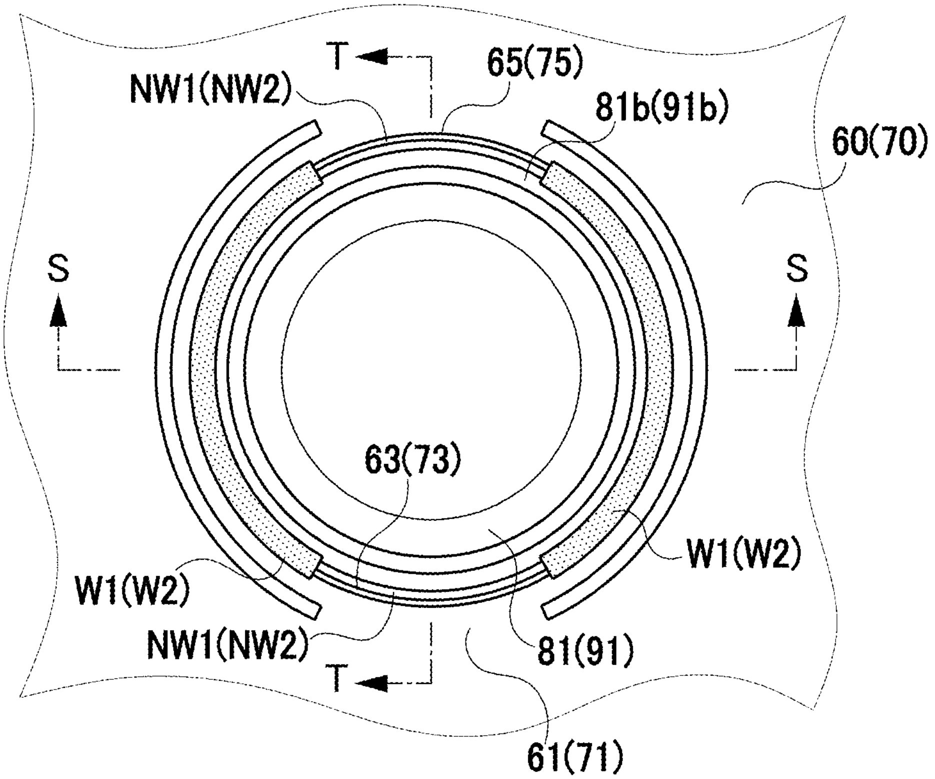
FIG. 6 is an enlarged view of a part L and a part M in FIG. 4.
Figure 7:
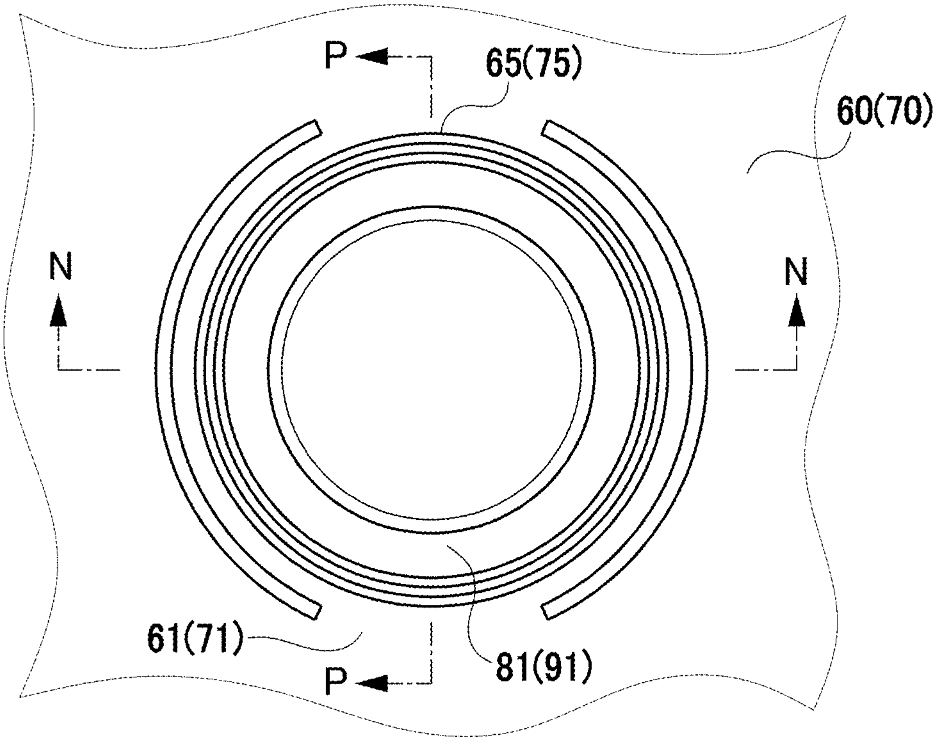
FIG. 7 is an enlarged back-surface-side plan view of a terminal member and its surroundings after an assembling process and before a swaging process at the same position with FIG. 6.
Figure 8:
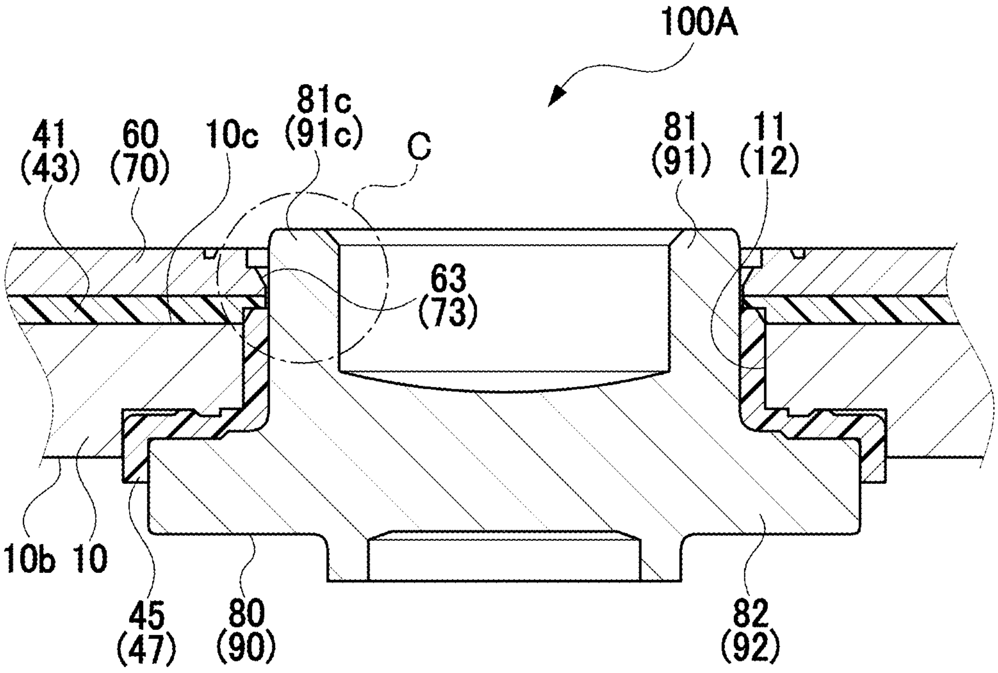
FIG. 8 is an enlarged sectional view taken along a line N-N in FIG. 7 in which a hole circumferential portion that is to become a welded portion later is cut in section.

Further, as similar to the positive welded portion W1, the negative welded portion W2 is formed not over the entire circumference of the hole circumferential portion 75 of the negative current collecting member 70, but formed partly in the circumferential direction of the hole circumferential portion 75 (see FIG. 6). Specifically, the negative welded portion W2 is of a circularly arcuate shape in planar view and two negative welded portions W2 are formed via a negative non-welded portion NW2 interposed therebetween in the circumferential direction of the hole circumferential portion 75. Further, the negative non-welded portion NW2 constitutes a negative-electrode second space S22 defined by the hole circumferential portion 75 and the swaged and deformed portion 91*b* which are separated from each other in the radial direction of the negative-electrode second insertion hole 73 so that the space S22 opens toward outside of the lid structure 100 (see FIG. 22 and FIG. 23). This negative-electrode second space S22 is communicated with the negative-electrode first space S12. Specifically, the negative-electrode second space S22 and the negative-electrode first space S12 are linked to each other in the circumferential direction of the hole circumferential surface 74. The thus configured power storage device 1 achieves further reduction of the voids in the negative welded portion W2.

Specifically, in welding the hole circumferential portion 75 of the negative current collecting member 70 and the swaged and deformed portion 91*b* of the negative terminal member 90, the gas is generated in the molten portion, but at least a part of this gas can be evacuated to the negative-electrode first space S12. Furthermore, the gas can be evacuated to the negative-electrode second space S22 that is communicated with the negative-electrode first space S12 and discharged outside the lid structure 100 from the negative-electrode second space S22. Thus, the voids generated in the negative welded portion W2 can further be reduced.

A manufacturing method of the power storage device 1 according to the present embodiment is now explained. Firstly, the lid structure 100 is formed. Specifically, in an assembling process the lid 10 is placed with facing its back face 10*c* upward and the positive current collecting member 60 is overlapped on the back face 10*c* side of the lid 10 with the positive insulation plate 41 interposed between the back face 10*c* and the positive current collecting member 60. In this state, the cylindrical portion 45*b* of the gasket 45 is inserted in the positive-electrode first insertion hole 11 from a front face 10*b* side of the lid 10, and the positive terminal inserting portion 81 of the positive terminal member 80 is inserted from the front face 10*b* side of the lid 10 in the positive-electrode first insertion hole 11, specifically, an inner side of the cylindrical portion 45*b* and in the positive-electrode second insertion hole 63 (see FIG. 3, FIG. 7, FIG. 8, and FIG. 10).

Further, in a state of overlapping the negative current collecting member 70 on the back face 10*c* side of the lid 10 with the negative insulation plate 43 interposed therebetween, the cylindrical portion 47*b* of the gasket 47 is inserted in the negative-electrode first insertion hole 12 from the front face 10*b* side of the lid 10, and the negative terminal inserting portion 91 of the negative terminal member 90 is inserted from the front face 10*b* side of the lid 10 in the negative-electrode first insertion hole 12, specifically, an inner side of the cylindrical portion 47*b* and in the negative-electrode second insertion hole 73 (see FIG. 3, FIG. 7, FIG. 8, and FIG. 10). Thus, the lid 10, the positive current collecting member 60, the positive terminal member 80, the positive insulation plate 41, the gasket 45, the negative current collecting member 70, the negative terminal member 90, the negative insulation plate 43, and the gasket 47 are assembled to configure an assembled structure 100A.

The hole circumferential surface 64 constituting the positive-electrode second insertion hole 63 has a step portion in a thickwise direction of the positive current collecting member 60. Specifically, the hole circumferential surface 64 includes a back-face-side hole circumferential surface 64*c* positioned on the back face 60*c* side of the positive current collecting member 60, a tapered surface 64*b* positioned closer to a front face 60*b* side than the back-face-side hole circumferential surface 64*c* with a smaller diameter than the back-face-side hole circumferential surface 64*c*, and a linking surface 64*d* of an circular and annular shape linking the back-face-side hole circumferential surface 64*c* and the tapered surface 64*b* (see FIG. 8 to FIG. 11). The tapered surface 64*b* is a tapered face which has gradually reduced dimension from the back face 60*c* side to the front face 60*b* side of the positive current collecting member 60.

Figure 9:
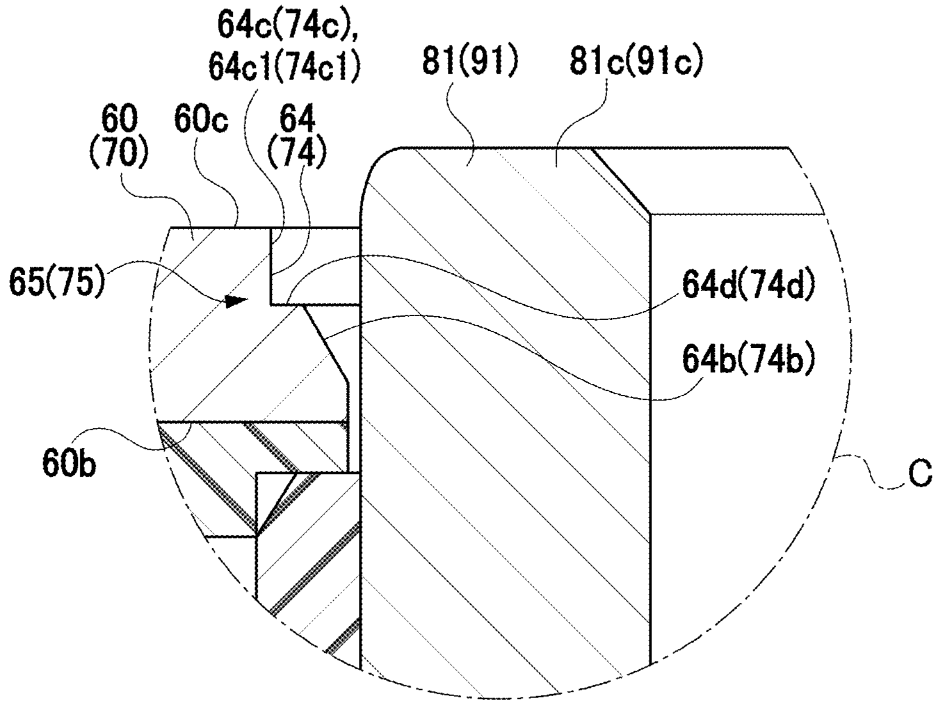
FIG. 9 is an enlarged view of a part C in FIG. 8.
Figure 11:
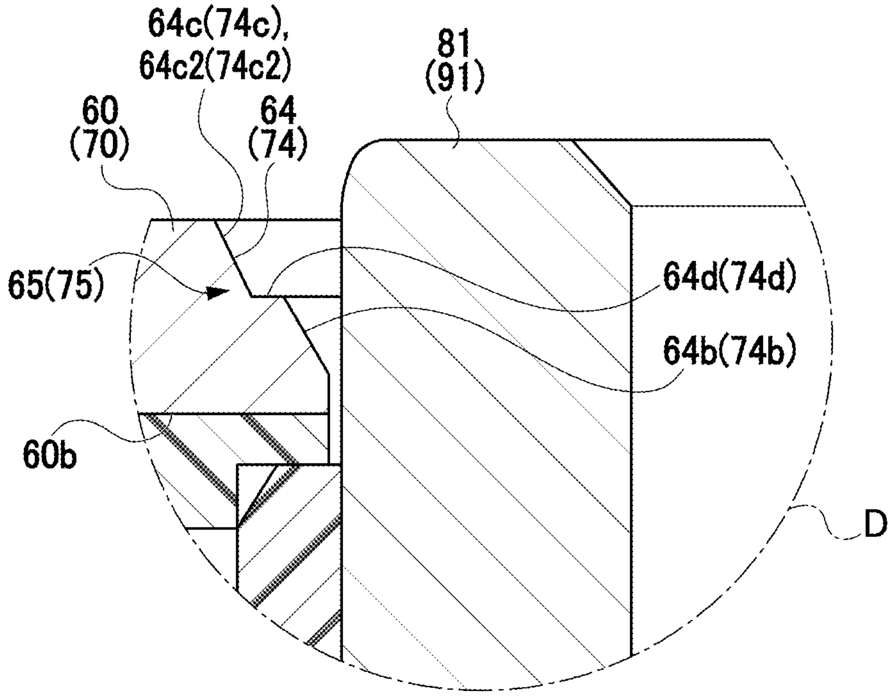
FIG. 11 is an enlarged view of a part D in FIG. 10.

As understood by comparing FIG. 9 and FIG. 11, the back-face-side hole circumferential surface 64*c* has the first portion 64*c*1 included in the hole circumferential portion 65, which is to be the positive welded portion W1 later, and a second portion 64*c*2 included in the hole circumferential portion 65, which is to be the positive non-welded portion NW1 later. The first portion 64*c*1 and the second portion 64*c*2 are different in their shape from each other. Specifically, the first portion 64*c*1 is shaped to extend straight in the thickwise direction of the positive current collecting member 60 as shown in FIG. 9. On the other hand, the second portion 64*c*2 is a slant surface having an inclination as much as inclined with the tapered surface 64*b* with a larger diameter than the first portion 64*c*1 as shown in FIG. 11.

Further, the hole circumferential surface 74 constituting the negative-electrode second insertion hole 73 has the similar shape with the hole circumferential surface 64 constituting the positive-electrode second insertion hole 63 and has a back-face-side hole circumferential surface 74*c*, a tapered surface 74*b*, and a linking surface 74*d* (see FIG. 8 to FIG. 11). The back-face-side hole circumferential surface 74*c* has a first portion 74*c*1 included in the hole circumferential portion 75, which is to be the negative welded portion W2 later, and a second portion 74*c*2 included in the hole circumferential portion 75, which is to be the negative non-welded portion NW2 later. The first portion 74*c*1 is shaped to extend straight in the thickwise direction of the negative current collecting member 70 while the second portion 74*c*2 is a slant surface having an inclination as much as inclined with the tapered surface 74*b* with a larger diameter than the first portion 74*c*1.

Figure 14:
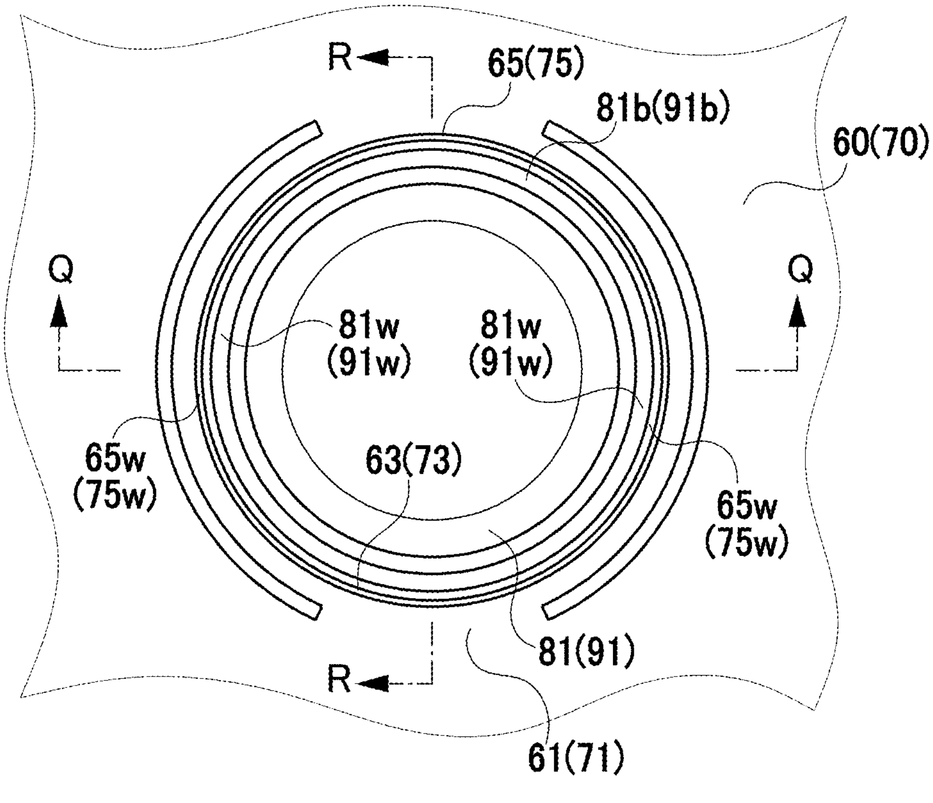
FIG. 14 is an enlarged back-surface-side plan view of the terminal member and its surroundings after the swaging process at the same position with FIG. 6.

Subsequently, in a swaging process, in a state of inserting the positive terminal inserting portion 81 of the positive terminal member 80 in the positive-electrode first insertion hole 11 and the positive-electrode second insertion hole 63, a to-be-swaged portion 81*c* of the positive terminal inserting portion 81 is swaged and deformed to form the swaged and deformed portion 81*b* (see FIG. 14 and FIG. 15). Herein, the to-be-swaged portion 81*c* is a leading end portion of the positive terminal inserting portion 81 which is to be the swaged and deformed portion 81*b*.

Figure 12:
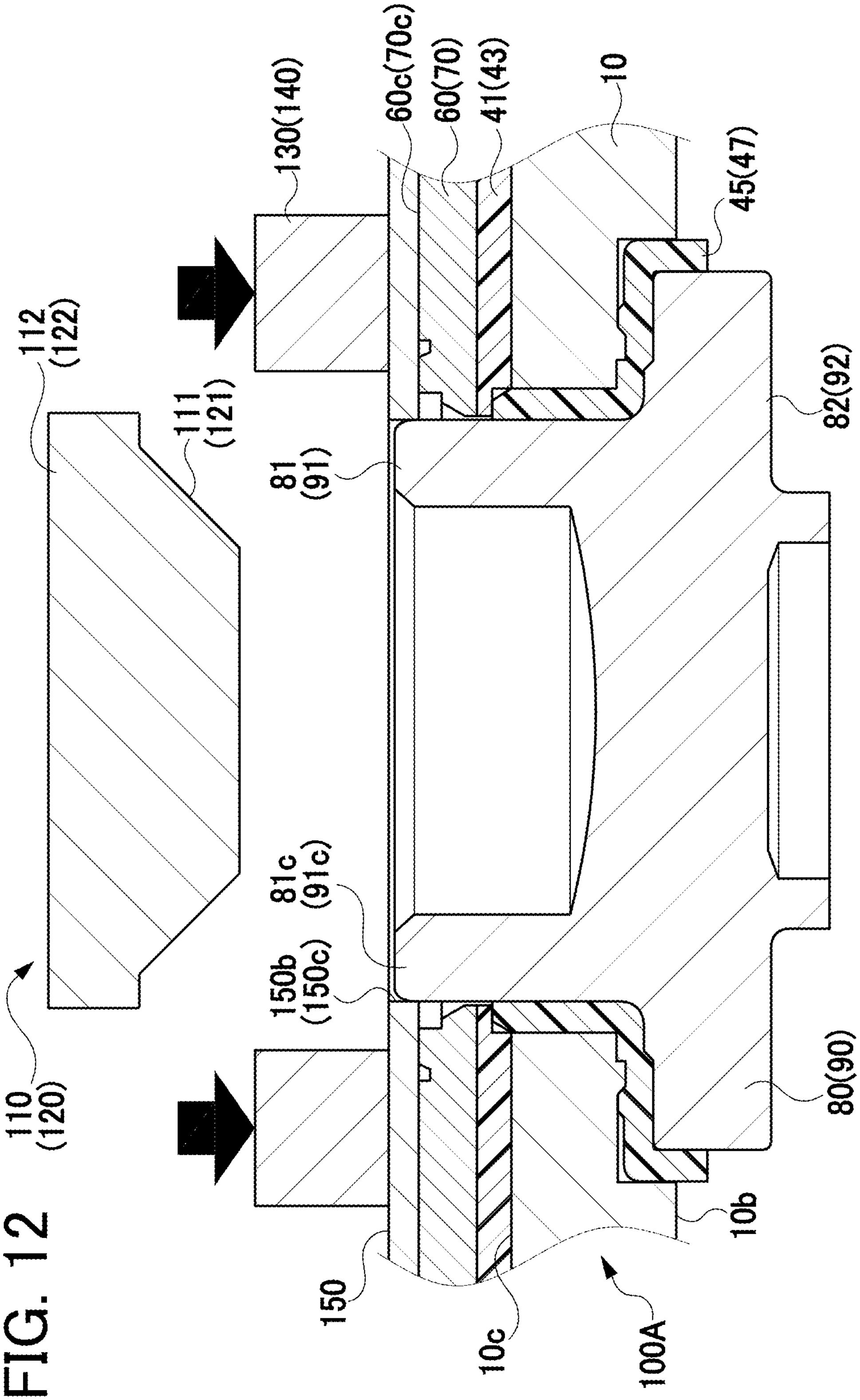
FIG. 12 is an explanatory view for a swaging process.

Specifically, as shown in FIG. 12, the assembled structure 100A that has been formed in the assembling process is placed with facing the back face 10*c* of the lid 10 upward, and a holding jig 150 of a flat plate-like shape is set on the assembled structure 100A, namely, on the back face 60*c* of the positive current collecting member 60 and the back face 70*c* of the negative current collecting member 70. The holding jig 150 is provided with a circular through hole 150*b* through which the positive terminal inserting portion 81 is inserted and a circular through hole 150*c* through which the negative terminal inserting portion 91 is inserted.

In this state, a circularly annular press member 130 presses a part of the back face 60*c* of the positive current collecting member 60 located around the positive-electrode second insertion hole 63 against the positive annular flange portion 82 of the positive terminal member 80 via the holding jig 150 so that the positive insulation plate 41 and the gasket 45 are compressed in the thickwise direction between the positive current collecting member 60 and the positive annular flange portion 82. Further, a circularly annular press member 140 presses a part of the back face 70*c* of the negative current collecting member 70 located around the negative-electrode second insertion hole 73 against the negative annular flange portion 92 of the negative terminal member 90 via the holding jig 150 so that the negative insulation plate 43 and the gasket 47 are compressed in the thickwise direction between the negative current collecting member 70 and the negative annular flange portion 92.

Figure 13:
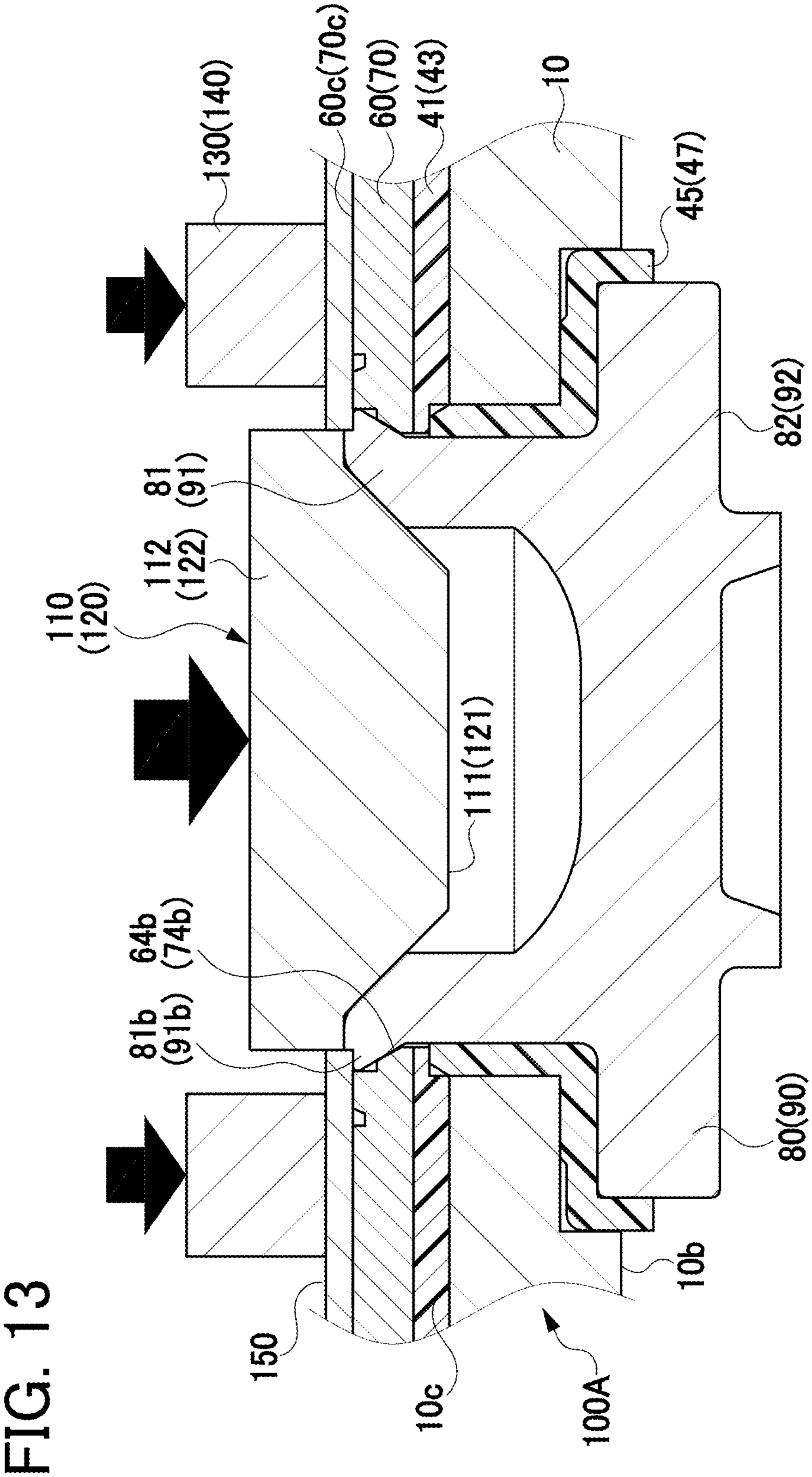
FIG. 13 is another explanatory view for the swaging process.

In this state, as shown in FIG. 12 and FIG. 13, the to-be-swaged portion 81*c* of the positive terminal inserting portion 81 is swaged and deformed by a punch 110 to form the swaged and deformed portion 81*b*. Herein, the punch 110 includes a first punch portion 111 tapering downward to be of a truncated conical shape and a second punch portion 112 of a circular plate-like shape located above the first punch portion 111.

Figure 16:
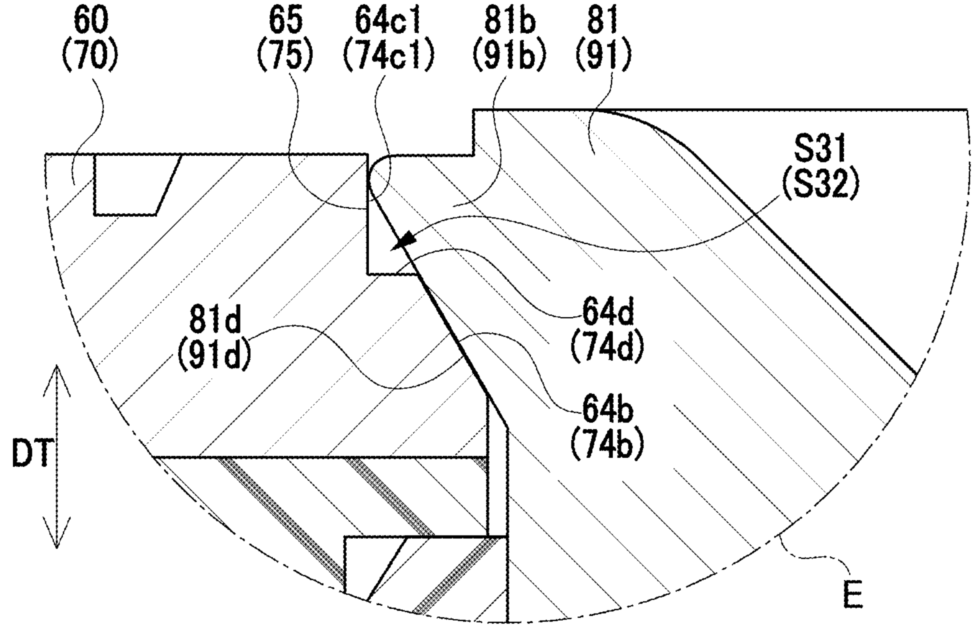
FIG. 16 is an enlarged view of a part E in FIG. 15.

As shown in FIG. 13, the punch 110 is moved downward to push the first punch portion 11 into an inside of the cylindrical to-be-swaged portion 81*c* so that the to-be swaged portion 81*c* is expanded radially outside and deformed. Further, the first punch portion 111 and the second punch portion 112 press the to-be-swaged portion 81*c* downward to form the swaged and deformed portion 81*b*. At this time, an outer circumferential surface of the swaged and deformed portion 81*b* has become a tapered surface 81*d* formed along the tapered surface 64*b* of the positive current collecting member 60. This tapered surface 81*d* of the swaged and deformed portion 81*b* comes to close contact with the tapered surface 64*b* of the positive current collecting member 60, and an outer circumferential surface of a leading end portion of the swaged and deformed portion 81*b* comes to close contact with a part of the first portion 64*c*1 on the back face 60*c* side of the hole circumferential surface 64 (see FIG. 16).

Figure 15:
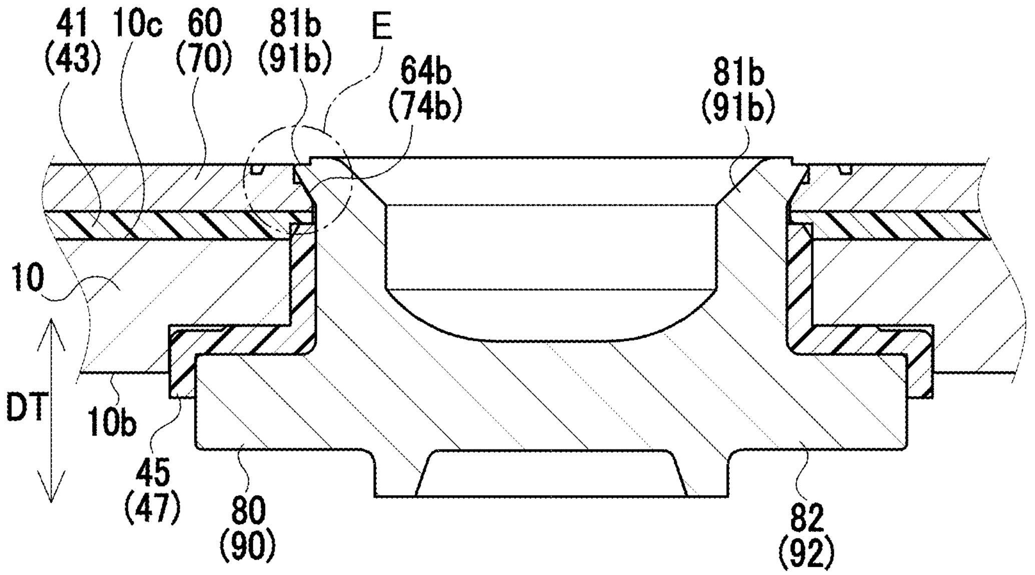
FIG. 15 is an enlarged sectional view taken along a line Q-Q in FIG. 14 at the same position with FIG. 8.

Thus, in a manner that the tapered surface 81*d* of the swaged and deformed portion 81*b* presses the tapered surface 64*b* of the positive current collecting member 60 downward on a side of the positive annular flange portion 82, the positive current collecting member 60, the positive insulation plate 41, the lid 10, and the gasket 45 are held and fixed between the swaged and deformed portion 81*b* and the positive annular flange portion 82 in the thickwise direction DT (see FIG. 15). As a result of this, a positive-electrode third space S31 (see FIG. 16) surrounded by the swaged and deformed portion 81*b* and the hole circumferential surface 64 (to be more specific, the first portion 64*c*1 and the linking face 64*d*) is formed.

Furthermore, as shown in FIG. 12 and FIG. 13, the to-be-swaged portion 91*c* of the negative terminal inserting portion 91 is swaged and deformed by a punch 120 to form the swaged and deformed portion 91*b*. Herein, the punch 120 includes a first punch portion 121 tapering downward to be of a truncated conical shape and a second punch portion 122 of a circular plate-like shape located above the first punch portion 121.

Specifically, as shown in FIG. 13, the punch 120 is moved downward to push the first punch portion 121 in an inside of the cylindrical to-be-swaged portion 91*c* so that the to-be-swaged portion 91*c* is expanded radially outside and deformed. Further, the first punch portion 121 and the second punch portion 122 press the to-be-swaged portion 91*c* downward to form the swaged and deformed portion 91*b*. At this time, an outer circumferential surface of the swaged and deformed portion 91*b* has become a tapered surface 91*d* formed along the tapered surface 74*b* of the negative current collecting member 70. This tapered surface 91*d* of the swaged and deformed portion 91*b* comes to close contact with the tapered surface 74*b* of the negative current collecting member 70, and an outer circumferential surface of a leading end portion of the swaged and deformed portion 91*b* comes to close contact with a part of the first portion 74*c*1 on the back face 70*c* side of the hole circumferential surface 74 (see FIG. 16).

Thus, in a manner that the tapered surface 91*d* of the swaged and deformed portion 91*b* presses the tapered surface 74*b* of the negative current collecting member 70 downward to a side of the negative annular flange portion 92, the negative current collecting member 70, the negative insulation plate 43, the lid 10, and the gasket 47 are held and fixed between the swaged and deformed portion 91*b* and the negative annular flange portion 92 in the thickwise direction DT (see FIG. 15). As a result of this, a negative-electrode third space S32 (see FIG. 16) surrounded by the swaged and deformed portion 91*b* and the hole circumferential surface 74 (to be more specific, the first portion 74*c*1 and the linking face 74*d*) is formed. Accordingly, the lid structure 100, in which the lid 10, the positive current collecting member 60, the positive terminal member 80, the positive insulation plate 41, the gasket 45, the negative current collecting member 70, the negative terminal member 90, the negative insulation plate 43, and the gasket 47 are joined, is formed.

The positive-electrode third space S31 including the positive-electrode first space S11 is configured to extend in a part of the circumferential direction along the hole circumferential surface 64. Further, the positive-electrode third space S31 is adjacent to an opposite side (a lower side in FIG. 19) to a side (an upper side in FIG. 19) where the laser beam LB is to be irradiated to the to-be-welded portion 65*w* of the hole circumferential portion 65 and the to-be-welded portion 81*w* of the swaged and deformed portion 81*b* in the later laser welding process. The negative-electrode third space S32 including the negative-electrode first space S12 is configured to extend in a part of the circumferential direction along the hole circumferential surface 74. The negative-electrode third space S32 is adjacent to an opposite side (a lower side in FIG. 19) to a side (an upper side in FIG. 19) where the laser beam LB is to be irradiated to the to-be-welded portion 75*w* of the hole circumferential portion 75 and the to-be-welded portion 91*w* of the swaged and deformed portion 91*b* in the later laser welding process.

Figure 17:
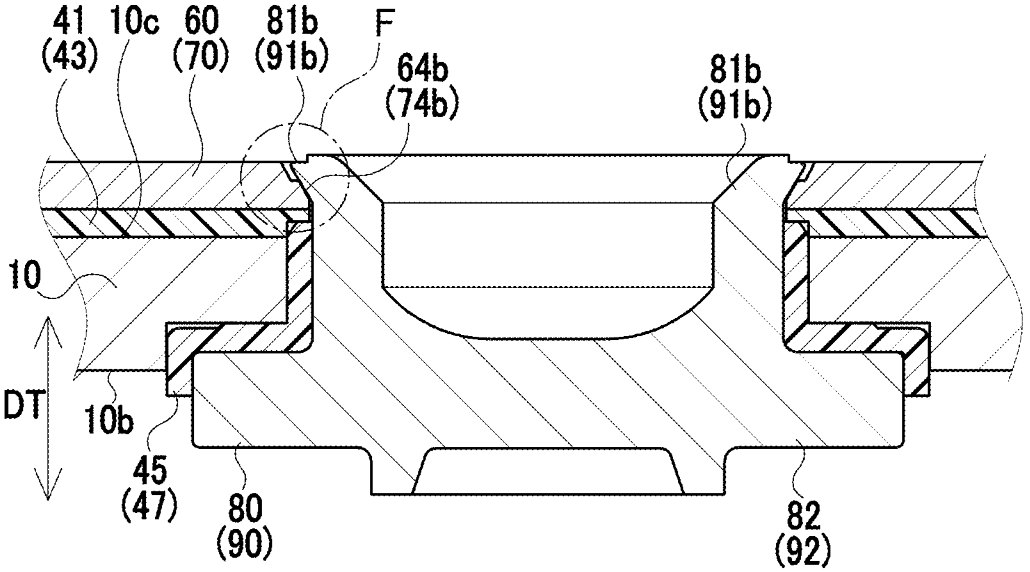
FIG. 17 is an enlarged sectional view taken along a line R-R in FIG. 14 at the same position with FIG. 10.
Figure 18:
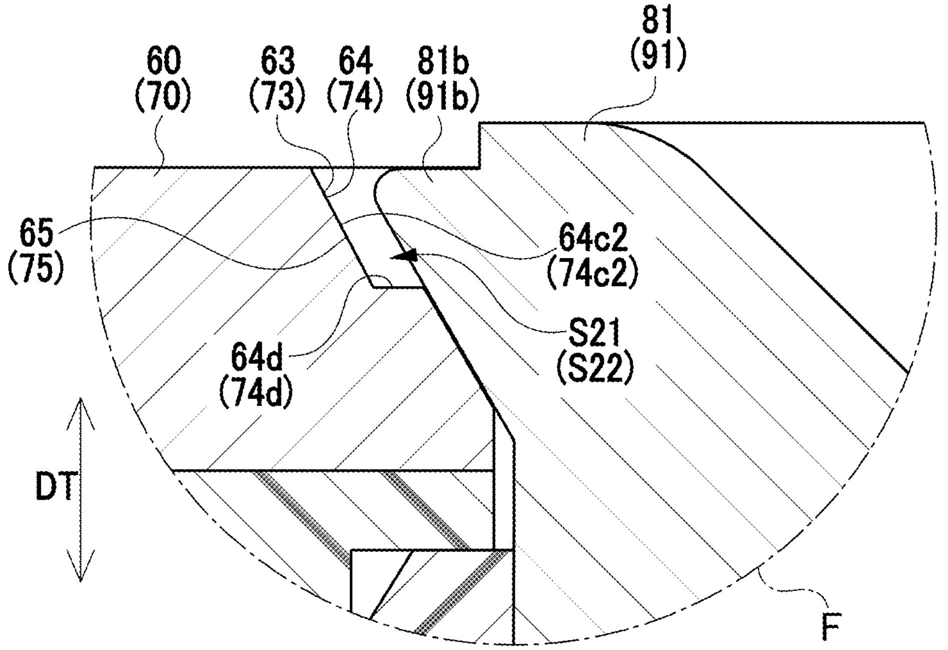
FIG. 18 is an enlarged view of a part F in FIG. 17.

On the other hand, the second portion 64*c*2 of the hole circumferential surface 64 is out of contact with an outer circumferential surface of the leading end portion of the swaged and deformed portion 81*b*, and thus the second portion 64*c*2 of the hole circumferential surface 64 and the swaged and deformed portion 81*b* are separated in a radial direction of the positive-electrode second insertion hole 63 (see FIG. 17 and FIG. 18). Thereby, a positive-electrode second space S21 opening outward is formed between the second portion 64*c*2 of the hole circumferential surface 64 and the swaged and deformed portion 81*b*. This positive-electrode second space S21 is communicated with the positive-electrode third space S31 and configured to extend in a part of the circumferential direction along the hole circumferential surface 64. To be more specific, the positive-electrode second space S21 and the positive-electrode third space S31 are linked to each other in the circumferential direction of the hole circumferential surface 64 to constitute an annular space portion along the entire circumference of the hole circumferential surface 64.

Further, the second portion 74*c*2 of the hole circumferential surface 74 is out of contact with an outer circumferential surface of the leading end portion of the swaged and deformed portion 91*b*, and thus the second portion 74*c*2 of the hole circumferential surface 74 and the swaged and deformed portion 91*b* are separated in a radial direction of the negative-electrode second insertion hole 73 (see FIG. 18). Thereby, a negative-electrode second space S22 opening outward is formed between the second portion 74*c*2 of the hole circumferential surface 74 and the swaged and deformed portion 91*b*. This negative-electrode second space S22 is communicated with the negative-electrode third space S32 and configured to extend in a part of the circumferential direction along the hole circumferential surface 74. To be more specific, the negative-electrode second space S22 and the negative-electrode third space S32 are linked to each other in the circumferential direction of the hole circumferential surface 74 to constitute an annular space portion along the entire circumference of the hole circumferential surface 74.

Figure 19:
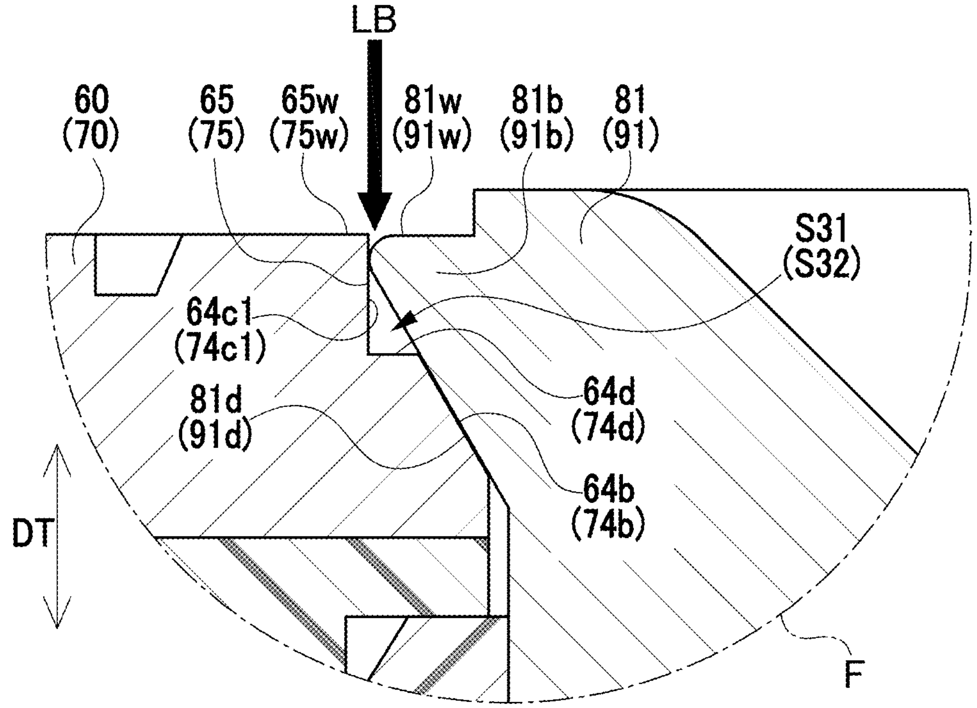
FIG. 19 is an explanatory view for a laser welding process.

Next, the laser welding process is performed to laser-weld the to-be-welded portion 65*w* of the hole circumferential portion 65 and the to-be-welded portion 81*w* of the swaged and deformed portion 81*b* in the lid structure 100 (see FIG. 19). Herein, the to-be-welded portion 65*w* of the hole circumferential portion 65 includes the first portion 64*c*1 of the hole circumferential surface 64, and the to-be-welded portion 81*w* of the swaged and deformed portion 81*b* is contacted with this first portion 64*c*1 of the hole circumferential surface 64. In the laser welding process of the present embodiment, laser welding is performed such that a part of the molten portion, in which the to-be-welded portion 65*w* of the hole circumferential portion 65 and the to-be-welded portion 81*w* of the swaged and deformed portion 81*b* are molten, reaches the positive-electrode third space S31 to form the positive welded portion W1 adjacent to the positive-electrode first space S11 (see FIG. 21). The positive-electrode first space S11 is a part of the positive-electrode third space S31. In other words, the positive-electrode first space S11 is a disappeared part of the positive-electrode third space S31 which has disappeared since entry of a part of the molten portion into a part (an upper part in FIG. 21) of the positive-electrode third space S31 causes a part of the welded portion to fill the subject part of the positive-electrode third space S31.

Accordingly, in starting the laser welding process, when the hole circumferential portion 65 and the swaged and deformed portion 81*b* are laser-welded in a state of oil adhering to a surface of the hole circumferential portion 65 or a surface of the swaged and deformed portion 81*b*, even if this oil is vaporized by the welding heat to generate gas in the molten portion, at least a part of the gas can be evacuated to the positive-electrode first space S11. Thereby, the voids generated in the positive welded portion W1 can be reduced, so that the strength of the positive welded portion W1 can be enhanced and the conductivity of the positive welded portion W1 can be improved.

Further, the to-be welded portion 75*w* of the hole circumferential portion 75 and the to-be-welded portion 91*w* of the swaged and deformed portion 91*b* are laser-welded (see FIG. 19). The to-be-welded portion 75*w* of the hole circumferential portion 75 includes the first portion 74*c*1 of the hole circumferential surface 74, and the to-be-welded portion 91*w* of the swaged and deformed portion 91*b* is contacted with this first portion 74*c*1 of the hole circumferential surface 74. To be specific, laser welding is performed such that a part of a molten portion, in which the to-be-welded portion 75*w* of the hole circumferential portion 75 and the to-be-welded portion 91*w* of the swaged and deformed portion 91*b* are molten, reaches the negative-electrode third space S32 to form the negative welded portion W2 adjacent to the negative-electrode first space S12 (see FIG. 21). Accordingly, even if oil adheres to a surface of the hole circumferential portion 75 or a surface of the swaged and deformed portion 91*b*, as similar to the above-mentioned positive welded portion W1, the voids generated in the negative welded portion W2 can be reduced, so that the strength of the negative welded portion W2 can be enhanced and the conductivity of the negative welded portion W2 can be improved.

Especially, in the laser welding process of the present embodiment, parts (not-to-be-welded portions) of the hole circumferential portion 65 and the swaged and deformed portion 81*b*, which are to form the positive-electrode second space S21, are not irradiated with the laser beam LB, but the to-be-welded portion 65*w* and the to-be-welded portion 81*w* constituting the positive-electrode third space S31 are molten to form the positive welded portion W1 in a part of the circumferential direction of the hole circumferential portion 65 (see FIG. 6). Thus, in the laser welding process, a configuration of the positive-electrode second space S21 opening to outside of the lid structure 100 is maintained. Therefore, in starting the laser welding process to laser-weld the hole circumferential portion 65 and the swaged and deformed portion 81*b* in a state of oil adhering to a surface of the hole circumferential portion 65 or a surface of the swaged and deformed portion 81*b*, even if this oil is vaporized by the welding heat to generate gas inside the molten portion, at least a part of the gas can be evacuated to the positive-electrode first space S11. Furthermore, the gas can be evacuated to the positive-electrode second space S21 communicated with the positive-electrode first space S11 to be discharged outside the lid structure 100 from the positive-electrode second space S21. Accordingly, the voids generated in the positive welded portion W1 can further be reduced.

Forming the negative welded portion W2 is as similar to the case of forming the positive welded portion W1. Namely, even if the gas is generated in the molten portion in laser-welding the hole circumferential portion 75 and the swaged and deformed portion 91*b*, at least a part of the gas can be evacuated to the negative-electrode first space S12 and further to the negative-electrode second space S22 communicated with the negative-electrode first space S12, so that the gas can be discharged outside the lid structure 100 from the negative-electrode second space S22. Accordingly, the voids generated in the negative welded portion W2 can further be reduced.

Subsequently, an electrode body 50 is prepared. The positive current collecting member 60 of the lid structure 100 is connected to the positive electrode plate 51 of this electrode body 50 via another component, and the negative current collecting member 70 of the lid structure 100 is connected to the negative electrode plate 52 of the electrode body 50 via another component, thereby integrating the lid structure 100 and the electrode body 50. Then, the electrode body 50 integrated with the lid structure 100 is housed in the case body 20 and the opening 20*b* of the case body 20 is closed by the lid 10. In this state, the lid 10 and the case body 20 are welded over the entire circumference. In this manner, the case body 20 and the lid 10 are joined to constitute the case 30. Thereafter, an electrolytic solution (not shown) is injected inside the case 30 through an injection hole (not shown) formed in the lid 10. After that, the injection hole is sealed and thus the power storage device 1 is completed.

The present disclosure has been explained above with the embodiment, but the present disclosure is not limited to the above embodiment and may be applied with any appropriate modifications without departing from the scope of the disclosure.

REFERENCE SIGNS LIST

1 Power storage device
10 Lid
11 Positive-electrode first insertion hole
12 Negative-electrode first insertion hole
20 Case body
20*b* Opening
30 Case
50 Electrode body
60 Positive current collecting member
63 Positive-electrode second insertion hole
64, 74 Hole circumferential surface
65, 75 Hole circumferential portion
70 Negative current collecting member
73 Negative-electrode second insertion hole
80 Positive terminal member
81 Positive terminal inserting portion
81*b*, 91*b* Swaged and deformed portion
90 Negative terminal member
91 Negative terminal inserting portion
100 Lid structure
S11 Positive-electrode first space
S12 Negative-electrode first space
S21 Positive-electrode second space
S22 Negative-electrode second space
S31 Positive-electrode third space
S32 Negative-electrode third space
W1 Positive welded portion
W2 Negative welded portion
NW1 Positive non-welded portion
NW2 Negative non-welded portion

What is claimed is:

1. A power storage device, comprising:

an electrode body; and a case housing the electrode body, wherein the case is provided with a case body member having an opening to house the electrode body and a lid closing the opening of the case body member, and having a first insertion hole penetrating through the lid in a thickwise direction, the power storage device includes:

a current collecting member provided in the case to be electrically connected to the electrode body, the current collecting member including a hole circumferential portion that has a hole circumferential surface forming a second insertion hole;

a terminal member including a terminal inserting portion of any one of a columnar shape and a cylindrical shape extending from outside to inside of the case, the terminal member including a swaged and deformed portion formed by swaging and deforming a part of the terminal inserting portion that has been inserted in the first insertion hole and the second insertion hole;

a welded portion in which the hole circumferential portion of the current collecting member and the swaged and deformed portion of the terminal member are welded; and a first space which is surrounded by the welded portion, the hole circumferential surface, and the swaged and deformed portion, wherein the first space is provided toward the lid with respect to the welded portion, is adjacent to the welded portion and extends in a circumferential direction along the hole circumferential surface.

2. The power storage device according to claim 1, wherein the lid, the terminal member, and the current collecting member are integrated to configure a lid structure, the welded portion is formed not over an entire circumference of the hole circumferential portion but on a part of the hole circumferential portion in a circumferential direction, a non-welded portion, in which the hole circumferential portion and the swaged and deformed portion are not welded, forms a second space in which the hole circumferential surface and the swaged and deformed portion are separated in a radial direction to open the second space to outside of the lid structure, and the first space is communicated with the second space.

3. A manufacturing method for the power storage device according to claim 1, the method including:

swaging to form a lid structure in which the terminal member, the current collecting member, and the lid are joined by forming the swaged and deformed portion that is formed by swaging and deforming a to-be-swaged portion of the terminal inserting portion in a state of inserting the terminal inserting portion in the first insertion hole of the lid and in the second insertion hole of the current collecting member; and laser-welding a to-be-welded portion of the hole circumferential portion and a to-be-welded portion of the swaged and deformed portion in the lid structure, wherein in the swaging, the swaged and deformed portion is formed and a third space containing the first space as a space surrounded by the swaged and deformed portion and the hole circumferential portion is formed, the third space is a space adjacent to a side opposite to a side where the to-be-welded portion of the hole circumferential portion and the to-be-welded portion of the swaged and deformed portion are irradiated with a laser beam in the laser-welding, and in the laser-welding, the laser-welding is performed such that a part of a molten portion, in which the to-be-welded portion of the hole circumferential portion and the to-be-welded portion of the swaged and deformed portion are molten, reaches the third space to form the welded portion adjacent to the first space.

4. The manufacturing method for the power storage device according to claim 3, wherein in the swaging, the swaged and deformed portion is formed and the third space extending in a part of a circumferential direction along the hole circumferential surface and a second space communicated with the third space and extending in a part of the circumferential direction along the hole circumferential surface are formed, the second space is a space opening to outside of the lid structure, the space being formed by separation of the hole circumferential surface and the swaged and deformed portion in a radial direction, the third space and the second space define an annular space portion formed along an entire circumference of the hole circumferential surface in planar view of the lid structure, and in the laser-welding, the hole circumferential portion and the swaged and deformed portion that define the second space are free from laser-beam irradiation while the to-be-welded portion of the hole circumferential portion and the to-be-welded portion of the swaged and deformed portion that define the third space are molten to from the welded portion in a part of the circumferential direction of the hole circumferential portion.

5. A manufacturing method for the power storage device according to claim 2, the method including:

swaging to form the lid structure in which the terminal member, the current collecting member, and the lid are joined by forming the swaged and deformed portion that is formed by swaging and deforming a to-be-swaged portion of the terminal inserting portion in a state of inserting the terminal inserting portion in the first insertion hole of the lid and in the second insertion hole of the current collecting member; and laser-welding a to-be-welded portion of the hole circumferential portion and a to-be-welded portion of the swaged and deformed portion in the lid structure, wherein in the swaging, the swaged and deformed portion is formed and a third space containing the first space as a space surrounded by the swaged and deformed portion and the hole circumferential portion is formed, the third space is a space adjacent to a side opposite to a side where the to-be-welded portion of the hole circumferential portion and the to-be-welded portion of the swaged and deformed portion are irradiated with a laser beam in the laser-welding, and in the laser-welding, the laser-welding is performed such that a part of a molten portion, in which the to-be-welded portion of the hole circumferential portion and the to-be-welded portion of the swaged and deformed portion are molten, reaches the third space to form the welded portion adjacent to the first space.

6. The manufacturing method for the power storage device according to claim 5, wherein in the swaging, the swaged and deformed portion is formed and the third space extending in a part of a circumferential direction along the hole circumferential surface and the second space communicated with the third space and extending in a part of the circumferential direction along the hole circumferential surface are formed, the second space is a space opening to outside of the lid structure, the space being formed by separation of the hole circumferential surface and the swaged and deformed portion in a radial direction, the third space and the second space define an annular space portion formed along an entire circumference of the hole circumferential surface in planar view of the lid structure, and in the laser-welding, the hole circumferential portion and the swaged and deformed portion that define the second space are free from laser-beam irradiation while the to-be-welded portion of the hole circumferential portion and the to-be-welded portion of the swaged and deformed portion that define the third space are molten to from the welded portion in a part of the circumferential direction of the hole circumferential portion.

* * * * *